United States Patent
Langmead et al.

(10) Patent No.: US 10,146,775 B2
(45) Date of Patent: Dec. 4, 2018

(54) APPARATUS, SYSTEM AND METHOD FOR STRING DISAMBIGUATION AND ENTITY RANKING

(71) Applicant: Apple Inc., Cupertino, CA (US)

(72) Inventors: Gregory C. Langmead, Pittsburgh, PA (US); Dominic J. Hughes, Cupertino, CA (US); Mark A. Gingrich, San Jose, CA (US); Ravi Chandra Jammalamadaka, Santa Clara, CA (US); Donald R. Beaver, Pittsburgh, PA (US); Shizhu Liu, Cupertino, CA (US); Pushkaraj Bhirud, Cupertino, CA (US); Kamal M. Ali, Campbell, CA (US); Daniel Ribeiro Silva, Sao Jose dos Campos (BR); Martin J. Murrett, Portland, OR (US)

(73) Assignee: Apple Inc., Cupertino, CA (US)

( * ) Notice: Subject to any disclaimer, the term of this patent is extended or adjusted under 35 U.S.C. 154(b) by 408 days.

(21) Appl. No.: 14/871,571

(22) Filed: Sep. 30, 2015

(65) Prior Publication Data

US 2016/0357738 A1  Dec. 8, 2016

Related U.S. Application Data

(60) Provisional application No. 62/172,150, filed on Jun. 7, 2015.

(51) Int. Cl.
*G06F 17/30* (2006.01)
*G06F 17/22* (2006.01)
*G06F 17/27* (2006.01)

(52) U.S. Cl.
CPC .... *G06F 17/30011* (2013.01); *G06F 17/2235* (2013.01); *G06F 17/278* (2013.01);
(Continued)

(58) Field of Classification Search
CPC .......... G06F 17/30011; G06F 17/3053; G06F 17/30867; G06F 17/2235; G06F 17/278;
(Continued)

(56) References Cited

U.S. PATENT DOCUMENTS 7,017,114 B2 * 3/2006 Guo ........................ G06F 17/27
707/999.001
7,783,644 B1 * 8/2010 Petrou ............... G06F 17/30864
707/748

(Continued)

*Primary Examiner* — Merilyn Nguyen
(74) *Attorney, Agent, or Firm* — Fletcher Yoder PC

(57) ABSTRACT

Aspects of the present disclosure involve a mobile or computer reader application that obtains articles or other computer files from a central database and displays the articles to a user of the device. The reader application may be customizable around one or more characteristics of the user of the device. In one embodiment, the type and number of articles provided to the device and displayed in the reader application may be based on the determination of a category or type of usage of the application is performed by the user. Further, the determination of the use of the reader application on the device is performed by and contained within the device such that usage information is not shared with overall article providing system. In another embodiment, the article providing system and/or device may determine recommendations to provide to a user of the reading application. These recommendations may be based on one or more selected interests or topics of the user of the reading application.

20 Claims, 14 Drawing Sheets

(52) U.S. Cl.
CPC ...... *G06F 17/2785* (2013.01); *G06F 17/3053* (2013.01); *G06F 17/30684* (2013.01); *G06F 17/30737* (2013.01)

(58) Field of Classification Search
CPC . G06F 17/2785; G06F 17/30; G06F 17/30737
See application file for complete search history.

(56) References Cited

U.S. PATENT DOCUMENTS

| | | | | |
|---|---|---|---|---|
| 8,782,042 | B1* | 7/2014 | Cooke | G06F 17/30572 707/729 |
| 9,002,858 | B1* | 4/2015 | Dassa | G06Q 30/0202 705/319 |
| 9,336,211 | B1* | 5/2016 | Bousquet | G06F 17/30038 |
| 9,679,018 | B1* | 6/2017 | Yuksel | G06F 17/30699 |
| 2008/0209339 | A1* | 8/2008 | Macadaan | G06F 3/0482 715/745 |
| 2009/0144609 | A1* | 6/2009 | Liang | G06F 17/278 715/230 |
| 2011/0004606 | A1* | 1/2011 | Aumann | G06F 17/30675 707/759 |
| 2011/0258049 | A1* | 10/2011 | Ramer | G06F 17/30867 705/14.66 |
| 2011/0320437 | A1* | 12/2011 | Kim | G06F 17/3089 707/722 |
| 2012/0109966 | A1* | 5/2012 | Liang | G06F 17/30873 707/740 |
| 2012/0240020 | A1* | 9/2012 | McKeown | G06Q 10/10 715/205 |
| 2012/0254188 | A1* | 10/2012 | Koperski | G06F 17/30663 707/740 |
| 2014/0372468 | A1* | 12/2014 | Collins | G06F 17/30522 707/769 |
| 2015/0081276 | A1* | 3/2015 | Gerard | G06F 17/2735 704/9 |
| 2015/0154306 | A1* | 6/2015 | Lightner | G06F 17/30867 707/728 |
| 2015/0161205 | A1* | 6/2015 | Beach | G06F 17/3028 707/748 |
| 2016/0034922 | A1* | 2/2016 | Chhaya | G06Q 30/0201 705/7.29 |

* cited by examiner

"Apple's CEO, Tim Cook,..."

APPARATUS, SYSTEM AND METHOD FOR STRING DISAMBIGUATION AND ENTITY RANKING

RELATED APPLICATIONS

This application claims priority under 35 U.S.C. § 119(e) to U.S. Provisional Application No. 62/172,150 entitled "APPARATUS, SYSTEM AND METHOD FOR STRING DISAMBIGUATION AND ENTITY RANKING", filed on Jun. 7, 2015 which is incorporated by reference in its entirety herein.

TECHNICAL FIELD

This disclosure relates generally to mobile applications, and more specifically to a reader application that provides written articles or other types of files to a user of the application for consumption by the user on the user's mobile device.

BACKGROUND

People are consuming greater and greater amounts of information from on-line and electronic sources. For example, many users access online magazines or newspaper websites through a browser or other Internet accessing application on some form of computing device (e.g., smart phone or tablet) to read or otherwise consume articles available through websites. Typically, however, the user must manually access the website to check the website for new content. Continuous checking of websites for new content may be time consuming for a user and a drain on resources of the computing devices.

In response, reader aggregators have been developed that instructs a browser of a computing device to constantly monitor a website for new articles or other content and inform a user of the feed of any updates. In some instances, the reader aggregator is configured to download all new articles or content uploaded to a website. The reader aggregator also generally provides a user interface through which the new content is available to be consumed. However, such reader aggregators are generally conduits through which all new information and/or articles from a website to which a user of the aggregator subscribes are collected. Analysis of the available content and configuration of the content provided to the aggregator are limited in typical reader aggregators.

SUMMARY

One implementation of the present disclosure may take the form of a method for classifying an article. The method includes the operations of spotting an article to identify one or more entities, the one or more entities comprising strings of text within the article, determining the location within the article of the occurrences of at least one entity of the one or more entities, and assigning a weighted score to each of the occurrences of the at least one entity of the one or more entities, the weighted score based at least on the location within the article of each of the occurrences. In addition, the method may include the operations of summing the weighted score for each of the occurrences of the at least one entity of the one or more entities to calculate an entity importance score, assigning the entity importance score to the at least one entity of the one or more entities, and storing the entity importance score and an identifier of the at least one entity with the article in an article database.

Another implementation of the present disclosure may take the form of a system for classifying a collection of computer files. The system includes an article database storing a plurality of article-based computer files, a spotting device in communication with the article database to retrieve a first article of the plurality of article-based computer files from the article database and identify one or more entities within a first article of the plurality of article-based computer files, the one or more entities comprising strings of text within the first article, and an entity ranker device executing one or more computer-executable instructions. When executed, the instructions cause the entity ranker device to determine the location within the article of the occurrences of at least one entity of the one or more entities, assign a weighted score to each of the occurrences of the at least one entity of the one or more entities, the weighted score based at least on the location within the first article of each of the occurrences, and sum the weighted score for each of the occurrences of the at least one entity of the one or more entities to calculate an entity importance score. The entity ranker may also assign the entity importance score to the at least one entity of the one or more entities and store the entity importance score and an identifier of the at least one entity with the first article in the article database.

Yet another implementation of the present disclosure may take the form of a non-transitory computer-readable medium storing one or more executable instructions to perform a computer-implemented method. The method includes the operations of spotting an article to identify one or more entities comprising strings of text within the article and the location within the article of the occurrences of at least one entity of the one or more entities, assigning a weighted score to each of the occurrences of the at least one entity of the one or more entities, the weighted score based at least on the location within the article of each of the occurrences, and summing the weighted score for each of the occurrences of the at least one entity of the one or more entities to calculate an entity importance score. The computer-implemented method further includes assigning the entity importance score to the at least one entity of the one or more entities and storing the entity importance score and an identifier of the at least one entity with the article in an article database.

DETAILED DESCRIPTION

Figure 1:
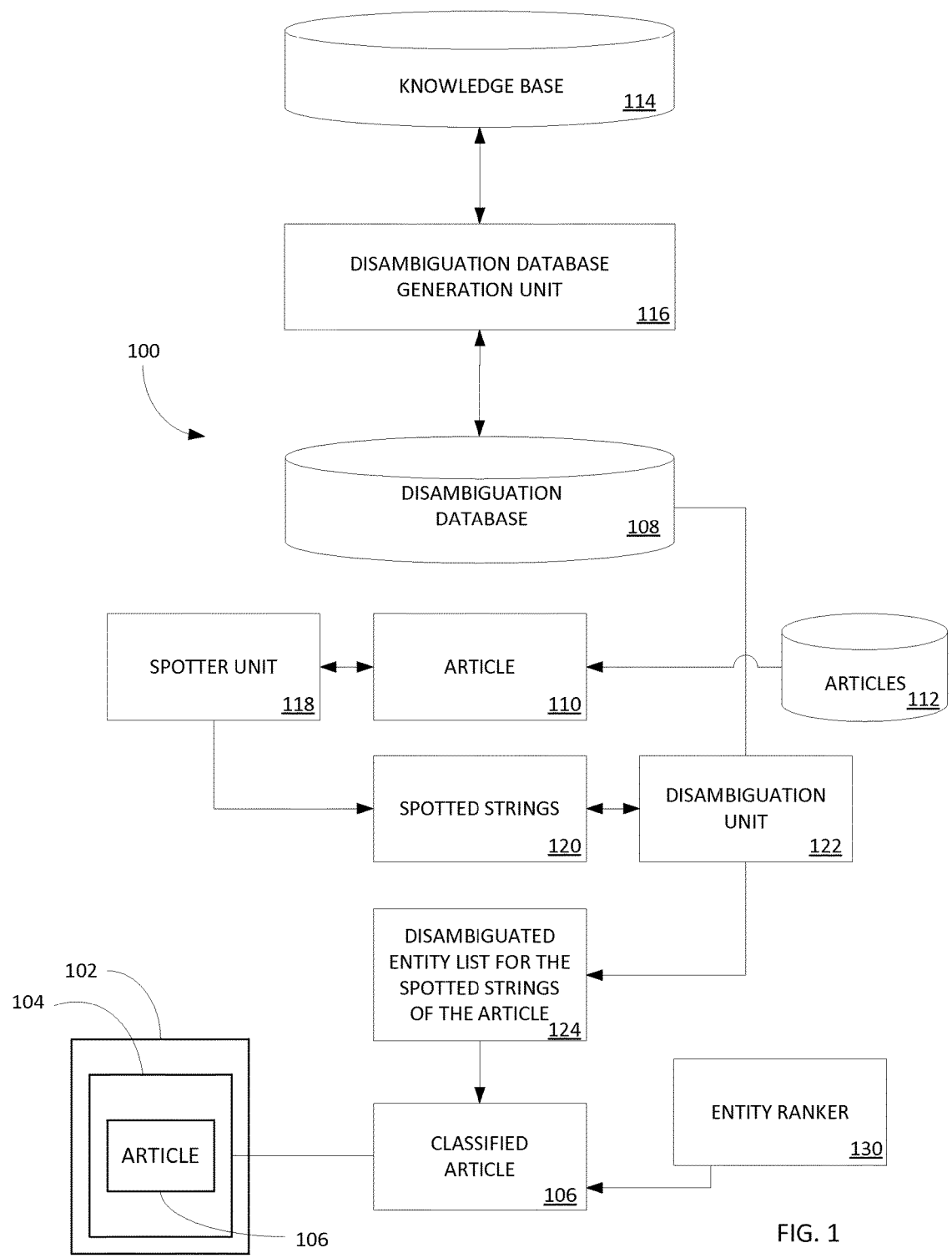
FIG. 1 is a system diagram of a disambiguation system according to one embodiment of the present disclosure.

Aspects of the present disclosure are related to a reader application, which may be operating on a mobile device, tablet, or other computation platform, that obtains electronic articles or other computer files from one or more databases, data stores, or other data sources and displays a selection of articles for viewing through the reader. For various possible functions of the reader application, as well as other applications, words in an article are disambiguated. Disambiguation involves deciphering or interpreting the meaning of a term or phrase or some other string within an article (or other collection of data) when the string is subject to two or more meanings. At a high level, answering the question—does the term "apple" refer to the fruit or the company?—with some likelihood of answering the question correctly, is an example of disambiguation.

In further aspects of the present disclosure, the system analyzes the association of the spotted entities with the particular article to determine the relative importance of a particular entity to the article of the system. In particular, the system analyzes the article to determine a number of occurrences of the entity within the article and a location of those occurrences within the article. Additionally, the system determines a relationship between the identified entities from an entity database source to determine topical similarities of the spotted entities. Further, the system assigns or otherwise associates an importance score in relation to the analyzed article for each identified entity. This score may be used by the system to determine the topic or meaning of the article, such as by associating those entities with the highest entity score with the article in an article database. The system may also then utilize the associated entities when providing articles to a reader application on a computing device. For example, a reader application may be subscribed to receive articles about a particular topic. The topic of any article within the article database may be determined by an associated entity based on the entity score calculated by the system.

In general, articles may be any electronic or computer data file that provides information about a topic or news item and may include images, embedded videos, music or other audio files, graphic interchange format (GIF) images, text, links to webpages or other documents, and any other type of computer data. To provide disambiguation, a knowledge base, such as Wikipedia or another similar large scale interconnected set of entities, is processed to provide a disambiguation database. When an article is received, entity spotting is performed, in order to identify entities referenced in the article and to which the article may be related, and the disambiguation database is used to generate probabilities, which account for the other entities spotted in the article, to disambiguate strings susceptible to association with more than one entity.

In general, the system correlates selected topics or interests to a relational map of all possible topics or interests available through the reader application. These recommendations may be based on particular topics (otherwise known as "entities") or particular publishers (otherwise known as "channels") that are available to follow through the reader application and are selected by the user of the reader application. Such recommendations are provided to a user through the reader application user interface and selected by the user to begin receiving articles pertaining to that topic or channel. Selected recommendations are then provided in the user's reader application interface for selection by the user similar to the other articles provided in the reader application.

A reader application is a program or application executed on a computing device that receives and displays articles or other types of data files for reading by a user of the application. Disambiguation is a process that is used in properly classifying an article so that when the reader application, or the like, requests articles for a particular topic (or a system delivers articles), articles relevant to the topic are delivered. The computing device used to execute the reader application may be any type of computing device, such as a personal computer, a laptop computer, a mobile phone, a tablet, and the like. One particular example of the reader application is illustrated in FIG. 1 as executed on a mobile device. In this example, a user of the device 102 selects a reader application on the device, such as through the selection of an icon on the device display. When executing, the reader application 104 provides a user interface that includes tiles, links, or icons representative of available articles. In one embodiment, the user interface of the reader application 104 includes a list of available articles. In another embodiment, shown in FIG. 1, the reader application includes several icons 106, or "tiles", that are selectable by a user of the device 102. To view an article, the user touches the respective tile 106 to launch or otherwise access the article represented by the tile. In this manner, the articles available through the reader application 104 may be read or otherwise accessed by the user of the device 102.

Although discussed herein as a text-based file, it should be appreciated that the articles available through the reader application 104 may be any type of computer data file. For example, the article may include images, embedded videos, music or other audio files, graphic interchange format (GIF) images, text, links to webpages or other documents, and the like. In one particular embodiment, the articles available through the reader application include web-based documents created through one or more publishers of web-based content and provided to or gathered for displaying within the reader application 104. In another embodiment, the articles are created specifically for the reader application 104 for use by users of the reader application.

The system 100 includes a disambiguation entity database 108 that stores any number of topics, or "entities", which may be used to determine the theme or topic of an article 110 from or intended for the article database 112. In general, each article in the article database 204 is associated with an entity that describes some topic of the article. For example, an article about a baseball game may include specific entities such as entities of each of the particular teams involved in the game, entities for players involved in the game (whether specifically mentioned in the article or not), entities for the location at which the game was played, and more general entities, such as "baseball", "sports", "news", and the like. Other entities of the article may identify the author and/or publisher of the article. Any number of entities may be associated with the article to aid the system 100 in classifying the articles within the article database 112 and then subsequently providing articles of interest to users of the reader application.

For consistency, the example of disambiguating between the term "apple" as it relates to the fruit and the term "Apple" as it relates to the company Apple Inc. will be used herein to illustrate various aspects of the present disclosure. With respect to distributing an article to a user, disambiguating between apple the fruit and Apple the company would help a system provide an article about the fruit to a reader interested in the fruit and an article about the company to a reader interested in the company.

In one embodiment, the disambiguation entity database 108 is populated from any type of database of potential article topics. For example, the system 100 may access a publicly or privately edited collection of potential article topics, such as an interconnected collection of web pages, to include in the entity database 108. The collection of web pages may be accessible by the system through several internet protocol (IP) addresses and processed to obtain information for inclusion in the database. The collection of web pages may be general knowledge information or may be specific to a particular area of study, such as medicine or technology. Moreover, multiple database stores of article topics may be parsed and the results aggregated.

Figure 2:
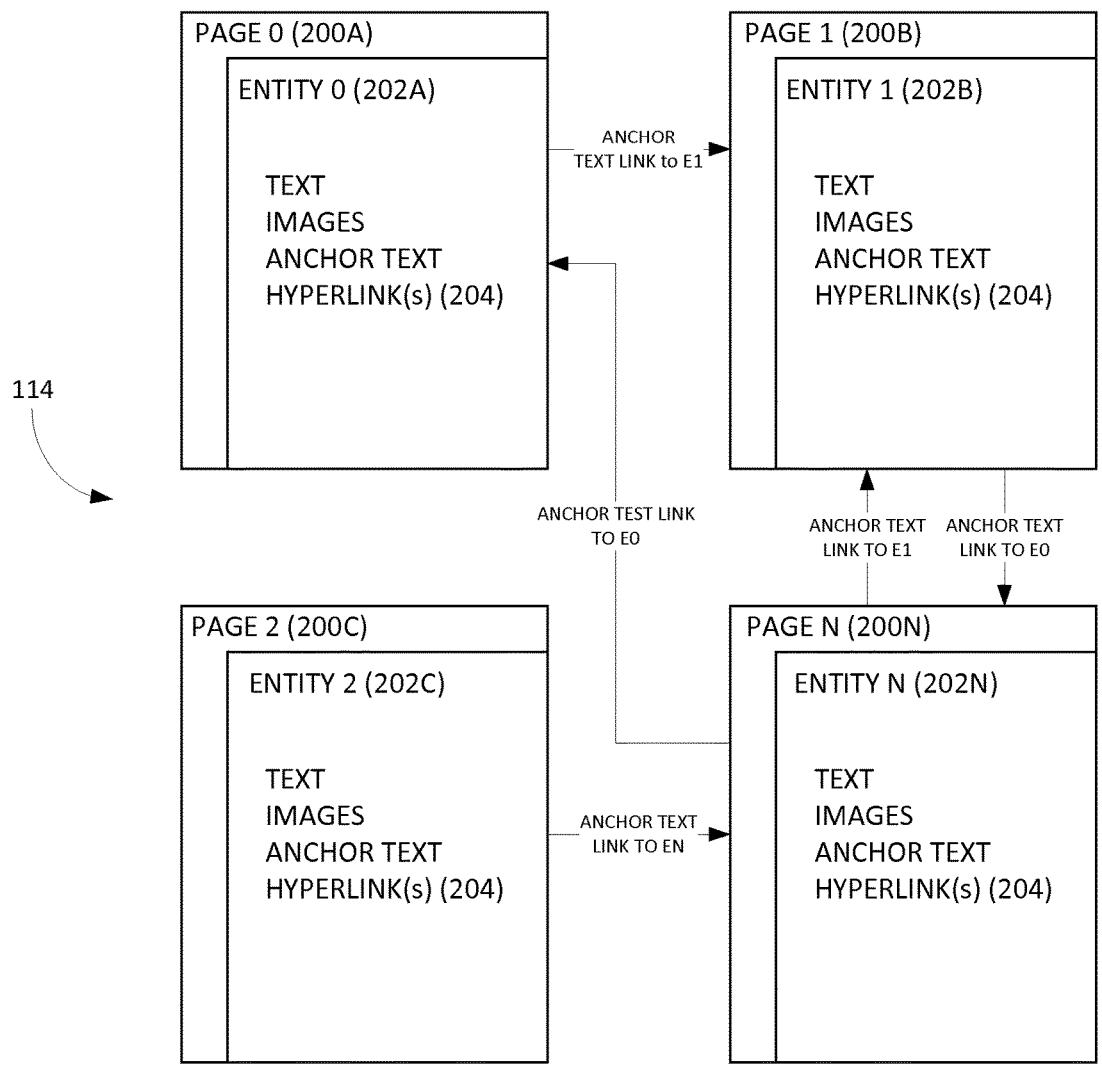
FIG. 2 is a representative diagram of a knowledge base including a plurality of pages containing anchor text linked to entities of the plurality of pages.

FIG. 2 is a diagram of a knowledge base of various pages 200A-200N for various possible entities 202A-202N. In such a knowledge base, the entity "apple" would have a page with some description, including text and images, concerning the fruit apple. Such a page would also likely include one or more links 204 (e.g., hyperlinks) to other pages for other entities in the knowledge base that are somehow related to the fruit apple. Similarly, the entity "Apple Inc." for the company would also include a page with some number of hyperlinks such as to the entity "chief executive officer" and to the entity "Tim Cook" who is the current CEO of Apple Inc.

The knowledge base 114 may also recognize any number of possible redirects to pages. For example, the string "007" may redirect to the page for James Bond. In such a situation, the presence of a hard redirect is a strong indicator that the string "007" relates to the fictional character James Bond (entity) represented in the knowledge base as the string "James Bond." While the string 007 may refer to something else, the hard redirect is a helpful indicator.

Figure 3:
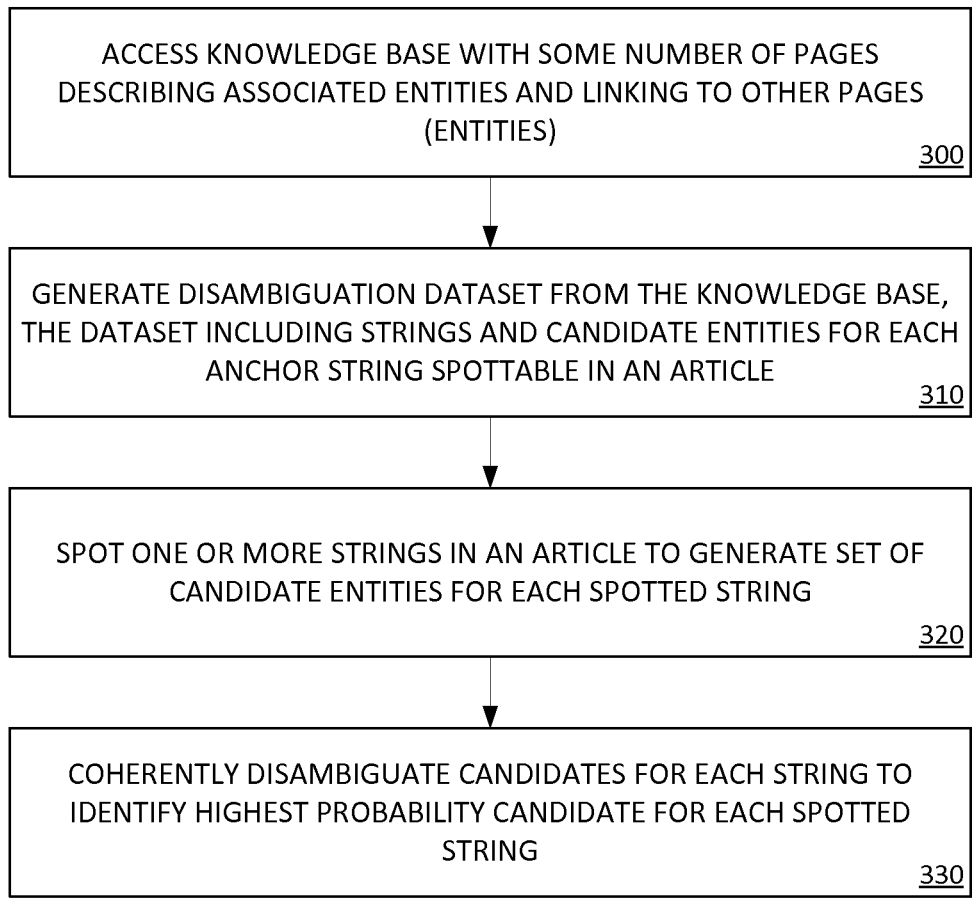
FIG. 3 is a flowchart of a disambiguation method according to one embodiment of the present disclosure.

FIG. 3 is a flow diagram illustrating the process of disambiguating an article, the details of which are discussed herein with reference to the various diagrams. Referring to FIG. 1 and FIG. 3, to begin, as introduced above, a disambiguation database generation unit 116, or some other aspect of the system 100, accesses a knowledge base with some number of interconnected pages describing entities associated with those pages (operation 300). From the knowledge base, the generation unit generates a disambiguation dataset (e.g., disambiguation database 108) that includes various possible strings and candidate entities for those strings (operation 310). For example, the string "apple" may have a candidate entity of "apple (fruit)" and another candidate entity of Apple Inc. The strings may be generated based on anchor texts found in the knowledge base and the candidate entities based on entities to which those anchor texts are linked. For example, in a page about fruit, the anchor text "apple" may be found and it may link to an entity "apple (fruit)" in the knowledge base, and similarly the anchor text "apple" in a page about technology companies may link to the entity "Apple Inc." To account for the relative influence of any given entity association with a string, an arrival probability may be used to weight links in a way to reflect the influence of the page including the anchor text.

Generally speaking, an article is then analyzed to spot, such as using a spotter unit 118, one or more strings 120 that match anchor text in the disambiguation dataset (operation 320). The spotted strings are not disambiguated without reference to other spotted strings, in one possible implementation. Rather, to coherently analyze an article and the spotted strings, candidate entities for any spotted string are disambiguated, such as using a disambiguation unit 122, with reference to other spotted strings to generate one or more entities 124 for some or all spotted strings (operation 330).

Figure 4:
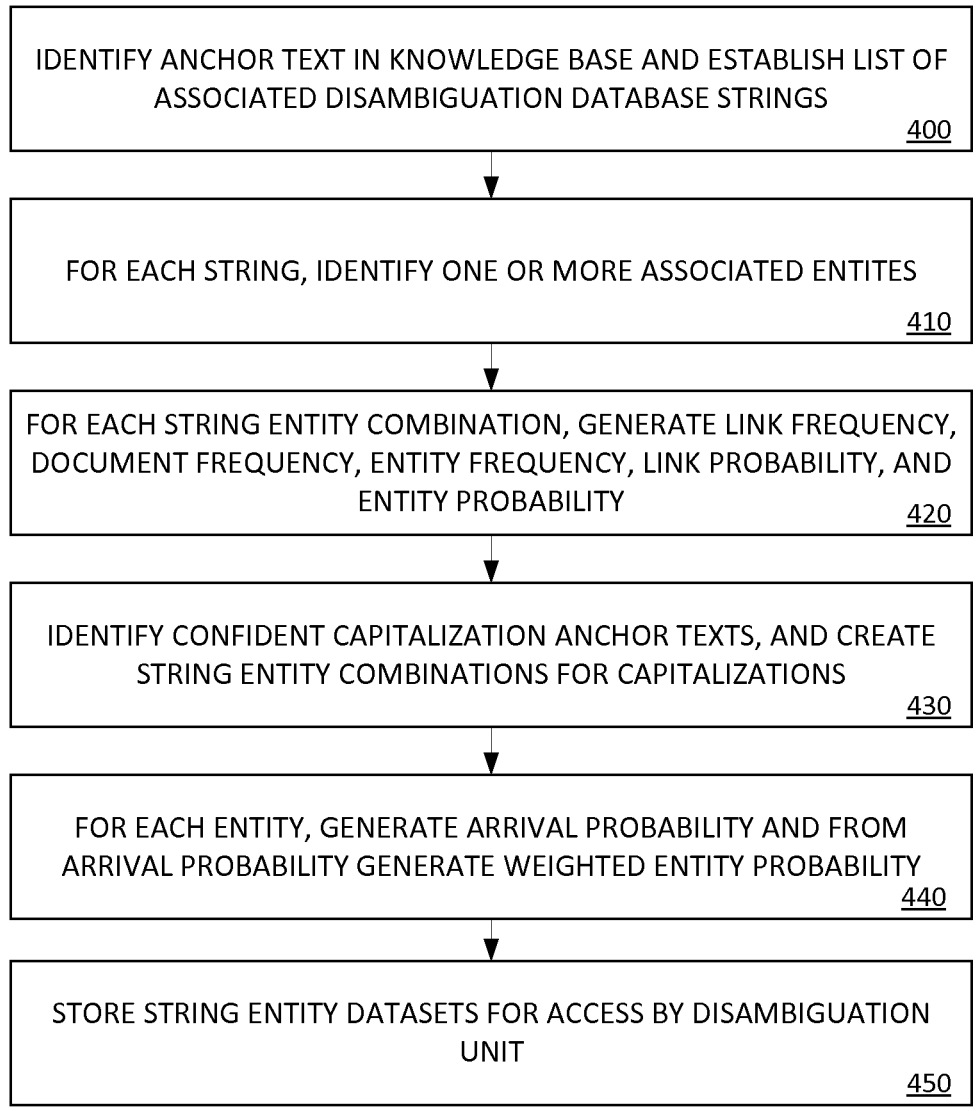
FIG. 4 is a flowchart of a method for generating a disambiguation database that may be used in a disambiguation method or otherwise according to one embodiment of the present disclosure.

Referring now to FIG. 4 as well as other figures, the disambiguation generation unit 116 first identifies anchor texts within the knowledge base to generate a list of possible strings that can be matched against strings in article (operation 400). Each anchor text is linked 204 to some entity 202 within the database, which combinations of strings and entities form string,entity combinations (operation 410). So, for example, the anchor text "apple" may be linked on some pages to the entity Apple (fruit) and may be linked on some pages to the entity Apple Inc. Thus, the disambiguation database would include a string,entity combination of apple, apple (fruit) and apple, Apple Inc.

For each string,entity combination or separately for each entity, a variety of metrics are gathered and/or calculated for later use in various possible operations, including the disambiguation operations (operation 420). It should be noted that the variety of metrics are gathered for entities, string-entity combinations, and/or strings. As a general notion, in creating the disambiguation database 108, the system does not treat each page 200 of the knowledge base with equal weight. Thus, those pages (or entities) more likely to influence a correct disambiguation are treated with higher weighting than those pages less likely to influence a correct disambiguation. In that regard, the disambiguation database includes several metrics for the entities of interest, which may include some or all entities from the reference knowledge base. Those metrics may then be used to disambiguate strings with an article accounting for collective associations between entities within the disambiguation database as understood from the knowledge base. Additional metrics may be gathered for strings and string-entity combinations.

More specifically, each possible string,entity combination in the disambiguation database has a structured dataset generated from processing the knowledge base that provides metrics by which later disambiguation, and other operations, may take advantage (operation 420). The following table lists a number of data elements obtained for each string in the disambiguation database, as well as example measurements and calculations for each element, where the examples are simplified for purposes of illustrating the concepts. The disambiguation database may establish a string for every form of anchor text found in the knowledge base. In this case, "apple" is a string that has numerous different pages including a page (an entity) for apple the fruit and Apple Inc. the company. Accordingly, the database includes data elements for each possible entity (e.g., Apple (fruit) and Apple Inc.) associated with the string (anchor text) (e.g., apple).

First, the database includes a link frequency (Link 10) that reflects the number of times the string is linked (e.g., in the form of an anchor text) within the knowledge base from another page. Second, the database includes a document frequency (Doc 10) that reflects the number of times the string occurs in a document. Thus, the Link 10 value and the Doc 10 value would be the same for all entities of a string as those values relate to the string. The entity frequency (Entity 10) value is based on the entity level and reflects the number of times the anchor text (string) links to the given entity. In the example below, the string "apple" links to Apple Inc. 50 of the 60 total links whereas the string "apple" links to Apple (fruit) 10 of the 60 total times.

The database further includes a link probability value and an entity probability value for each string/entity combination. The link probability (Link Prob) is the ratio of the link frequency to the document frequency and entity probability is the ratio of the entity frequency to the link frequency.

| String | Entity | Link 10 | Doc 10 | Entity 10 | Link Prob | Entity Prob (EP) | ARP weighted EP |
|---|---|---|---|---|---|---|---|
| apple | Apple Inc. | 60 | 100 | 50 | 60% | 5/6 | — |
| apple | Apple (fruit) | 60 | 100 | 10 | 60% | 1/6 | — |

In addition to anchor texts, a knowledge base may provide further sources of string-entity relationships. One example is redirect entries, which link a name to an entity by means of a forced redirect, which may for example perform a literal web browser redirect when the knowledge base is browsed in that manner. For example, entering the string "007" in a web browser of the knowledge base may automatically redirect to an entity page "James_Bond_(fictional_character)". Such string-entity relationships are gathered during the processing of the knowledge base, and combined with all the other string-entity relationships. The method of combination may include special flags or records to separate the origin of the relationship, for example to permit the disambiguation system to favor redirect relationships.

To further process the knowledge base and provide a more effective disambiguation database therefrom, the system may account for capitalizations of anchor texts within the knowledge base (operation 430). By tracking capitalizations, spotting of string matches, which further match or do not match with respect to capitalization, may be used to further enhance the accuracy of disambiguation. To begin, when building the disambiguation database, the unit 116 discriminates between those anchor texts that are reliably upper case, or reliably lower case, and discards those cases that are ambiguous or defers to lower case and tracks such reliable capitalizations. So, to create the entity frequency, only those reliable cases might be used. In the example of the anchor text "apple," if the capitalized form occurs at the start of a sentence it is not reliably upper case because the capitalization may be forced by its position at the start of the sentence. Similarly, the upper case form in a title is not reliably upper case as its presence in the title may dictate capitalization. In contrast, the presence of a capitalized instance of an anchor text in the middle of a sentence may be reliably upper case. Thus, the system discriminates between proper upper case observations and ambiguous upper case observations.

The system may, in some embodiments, include a string entity combination for the both the lower case form and upper case form of the string. So, there may be a string, entity combination of both Apple, Apple Inc. and apple, Apple Inc. In analyzing the knowledge base, a flag may be set for any string that is likely a forced capitalization. In some example, the flag may be used to simply discard the link from the metrics. Confident capitalizations are tracked in the upper case string, entity combination. Other ways of tracking and managing capitalizations are also possible.

In a large set of interconnected pages (hyperlinked) of a knowledge base, there are some pages (entities) that are more important to the process of disambiguation than other pages. As a general notion, an entity page that is extensively linked to and extensively linked from, may have a greater influence on a correct disambiguation as that page is considered to be well edited and to pertain an entity of interest and thus more likely to be the subject of an article. To provide a metric to account for and discriminate between lesser and greater importance/influential pages and the associated entities, aspects of the processing of the knowledge base to provide a disambiguation database involve the computation of a probability of arriving at a page (arrival probability) after some number (e.g., 5) of clicks starting with some origin or seed page (starting with an origin page, following hyperlinks until arriving at the page of interest at the fifth hyperlink). (operation 440)

Figure 5:
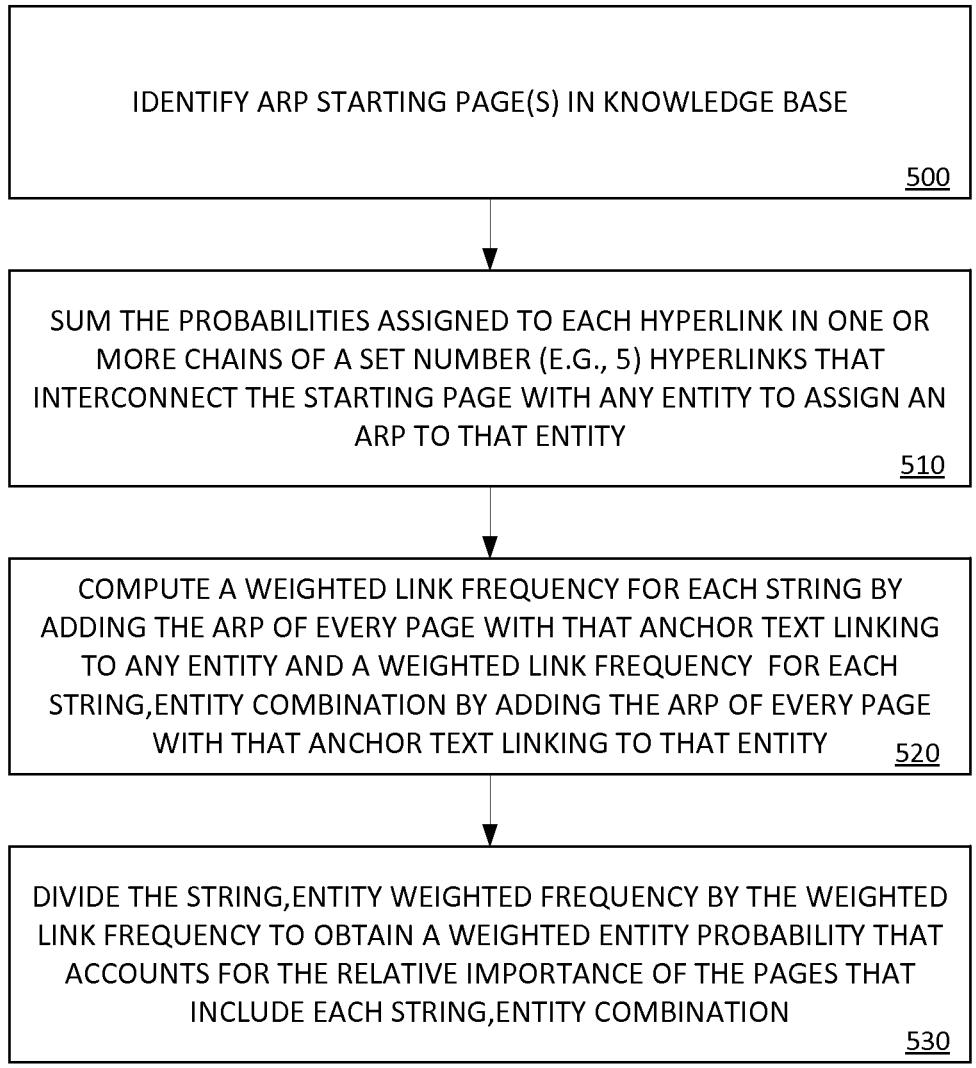
FIG. 5 is a flowchart for a method for determine and using an arrival probability according to one embodiment of the present disclosure.
Figure 6:
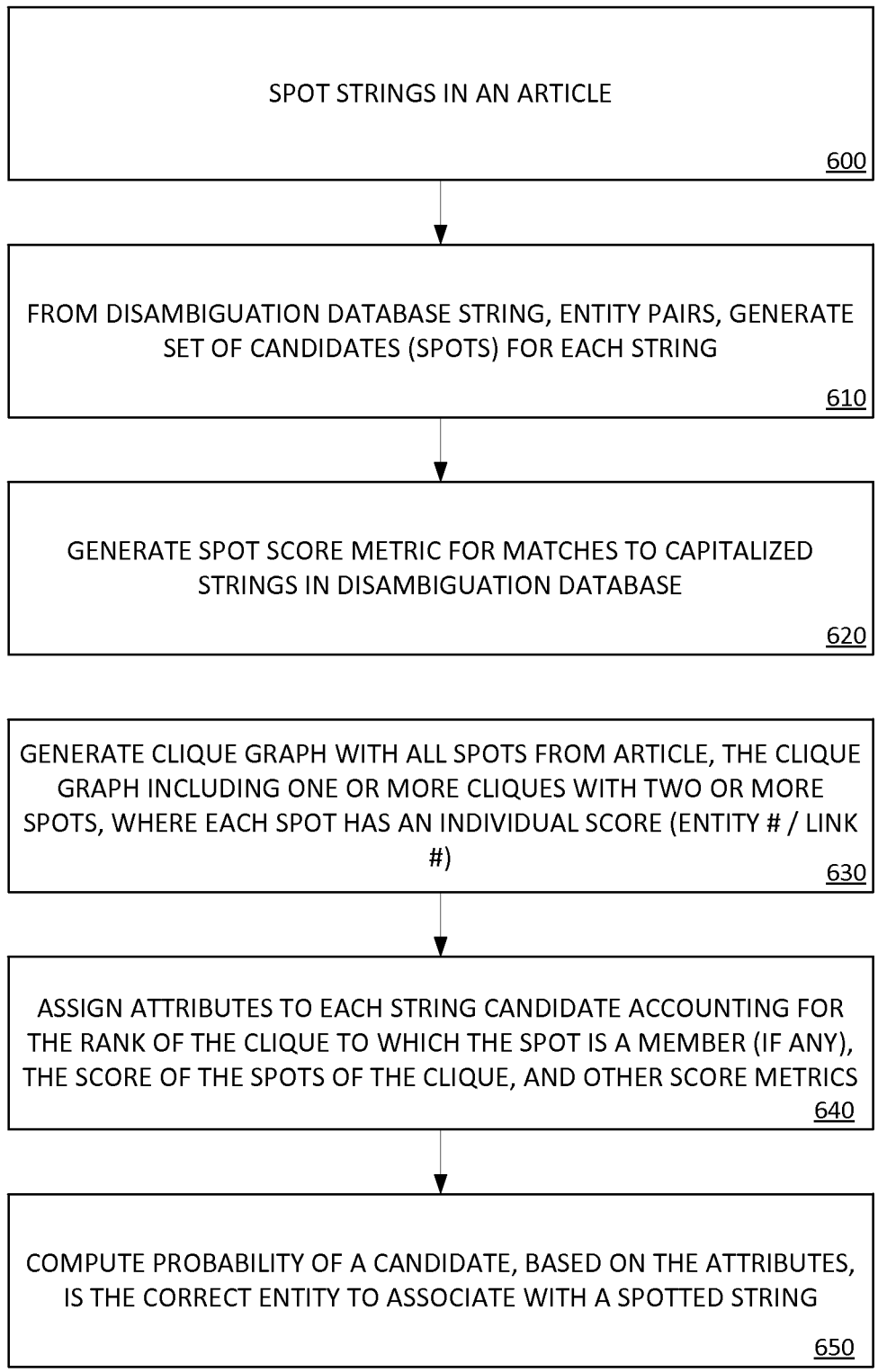
FIG. 6 is a flowchart of a method of disambiguation, including spotting strings in an article and disambiguating candidate entities for the spotted strings, according to one embodiment of the present disclosure.

Referring to FIG. 5, in one possible implementation, the ARP is computing beginning with a pair of origin pages of a knowledge base, such as an origin page of "topics" and "current events" (operation 500) although other origin pages and combinations are possible. Each page typically will have a discrete set of hyperlinks connecting a topic or current event to some entity page within the knowledge base. So, for example, the current events origin page may have 200 hyperlinks. The probability of selecting one of the 200 possible links is initially set at 1/200. In turn, the first set of linked entities will each also have some number of links to other entities, and so on. Of course, many entities will be linked from multiple other entities. The ARP for any given entity is a summation of the probabilities of arriving at the entity page by following five hyperlinks from one of the two origin pages (operation 510). A highly interconnected page with numerous links to it will have an ARP reflecting probabilities associated with each discrete link. Even though the ARP is based on arriving at a page after five clicks, it is believed that some knowledge bases, like Wikipedia, or so densely interconnected at the important page examples that important pages will always be present in the fifth tier.

It is also possible to use one or more than two origin pages, and to use some number of hyperlink connections besides five. In the example of Wikipedia as knowledge base, however, it is found that an ARP based on five links ensures that all important pages are captured with a statistically sufficient weighting, and obscure and unimportant pages are typically excluded or given a sufficiently low weighting that a connection from such a page does not inappropriately influence the disambiguation process.

Pages with a higher degree of interconnected links will generally have a higher ARP than those with a lower degree of interconnected links. Moreover, various obscure entities within the knowledge base may not be reachable after following a discrete number of links and will therefore receive a null value. Thus, the ARP is used to weight each page, and thus the weighted entity probability reflects a summation of a number of ARP weighted links to the entity. More specifically, to generate a weighted entity probability, the raw link frequency number is weighted using ARP scores for page to which a link to the entity exists (operation 520). A page with a higher ARP will thus have a higher entity link value. If an ARP score for a first page is 20 and an ARP score for a second page is 0.2, a link from the first page to an entity would cause the link frequency number to be incremented by +1(20) or +20 whereas a link from the second page to an entity would be incremented by +1(0.2) or +0.2. In the raw link frequency calculation, the sum of the link frequency would simply be 1 in each case. The weighted entity probability score is calculated in the same way as the raw entity probability score but uses a summation of the ARP weighted entity link values rather than a summation of the raw entity link count (operation 530). So, for example, should apple (fruit) have a higher number of higher weighted links relative to the Apple Inc. entity, its ARP weighted entity probability score will be proportionally higher relative to its raw entity probability score whereas the Apple Inc. weighted entity probability score will be proportionally lower that its raw entity probability score accounting for the influence of the linking entities in each case.

Referring to the unweighted link metrics, e.g., 50 for Apple Inc. and 10 for Apple (fruit), the raw link metrics ignore the importance of the pages linking to either entity. Thus, for example, if there are a high degree of very obscure pages that link to Apple Inc., those obscure pages would inappropriately bias the link count in favor of Apple Inc. Similarly, if well edited pages of a higher degree of relevance in the hierarchy of knowledge base include a link to either Apple Inc. or apple (fruit), those pages should have more influence on the disambiguation determination.

At some frequency or interval, such as daily, weekly, etc., the knowledge base is processed to generate string,entity combinations, as discussed, and/or update existing string, entity combinations and the disambiguation database is made available for use in disambiguation of spotted article strings (operation 450).

"Disambiguation" refers to notion of assigning probabilities that a string in an article refers to some specific entity that it matches. So, continuing with our example, if the string "Apple" is identified in an article, what is the probability it relates to the entity apple (fruit) as opposed the entity Apple Inc. Disambiguation may be performed in real-time when an article is received and being processed. The process of disambiguating strings within a document accounts for other strings in the document, and hence is collective in a nature and takes advantages of the coherent nature of many strings in a document. So, for example, an article discussing the company Apple Inc. may reference its chief executive officer (CEO), Tim Cook. Thus, the string "Apple" in such a document is more likely associated with Apple Inc. as opposed to apple (fruit) due to the coherent relationship to the "Tim Cook" string. In these cases, reliable capitalization of the name "Tim Cook" in the document and the string "Apple" in the document may also assist in the disambiguation determination.

Figure 7A:
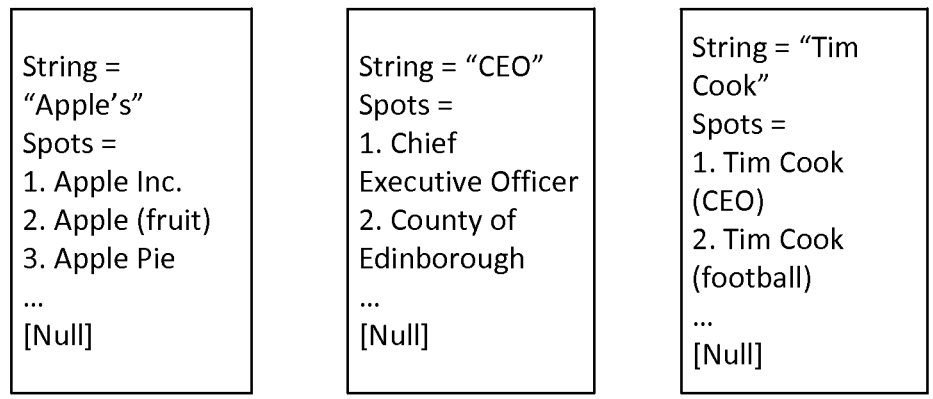
FIG. 7A is a sample phrase, spotted strings for the sample phrase and candidate entities (spots) for the spotted strings, according to one embodiment of the present disclosure.

Disambiguation begins with a spotting operation conducted against the article to spot (identify) the strings in the article that match a string in the disambiguation database (operation 600). For purposes of illustration, a sentence within an article in the form of "Apple's CEO, Tim Cook, . . . ." will be referenced in this discussion. Referring now to FIG. 7A, a set of candidates is generated for each identified string (operation 610). As shown in the diagram, the string "Apple's" may generate a list of candidates including Apple Inc., apple (fruit) and apple pie. The candidates within the set are also referred to as spots. Candidates in different sets may be the same. So, for example, Apple Inc. and apple (fruit) may appear as candidates (spots) for the string "Apple's" and the string "apple."

Referring again to the concept of capitalization, each spot may be given a score metric (or otherwise a numerical attribute, which is used with other score metrics to generate an overall score for the spot) based on whether or not it matches a reliably capitalized string from the disambiguation database (operation 620). During spotting, in one possible implementation, when a capitalized string is recognized (spotted) in the article, the system may conduct two queries—the first query being a case sensitive query against the string in the disambiguation database, and the second query is a lowercase version of the string. Thus, for example, there would be a query for the string "Apple" to identify whether the disambiguation database has any capitalized forms of the string "Apple," and a query for the string "apple" and then identify the entity matches for each query. Two queries are run, in this implementation, to identify a greater number (possibly) of candidates for each spot. However, if the string is uppercase, the lowercase candidate matches for the string may be embellished with a flag identifying the disagreement between the spotted string (uppercase) and the lowercase string from the database used to identify the possible entity match. Because other spot scores are used, however, the case match or mismatch is not relied on solely and the coherent nature of the disambiguation will allow a mismatched entity to still be selected if other analysis of the article causes the selection of the entity.

It is also possible, to quantify the query results based on the likelihood of a forced capitalization in the article, in a similar form the database creation where forced capitalizations are discounted or eliminated. For example, a case sensitive query might only be run when the capitalization is reliable. Otherwise, only the lower case query is run.

Figure 7B:
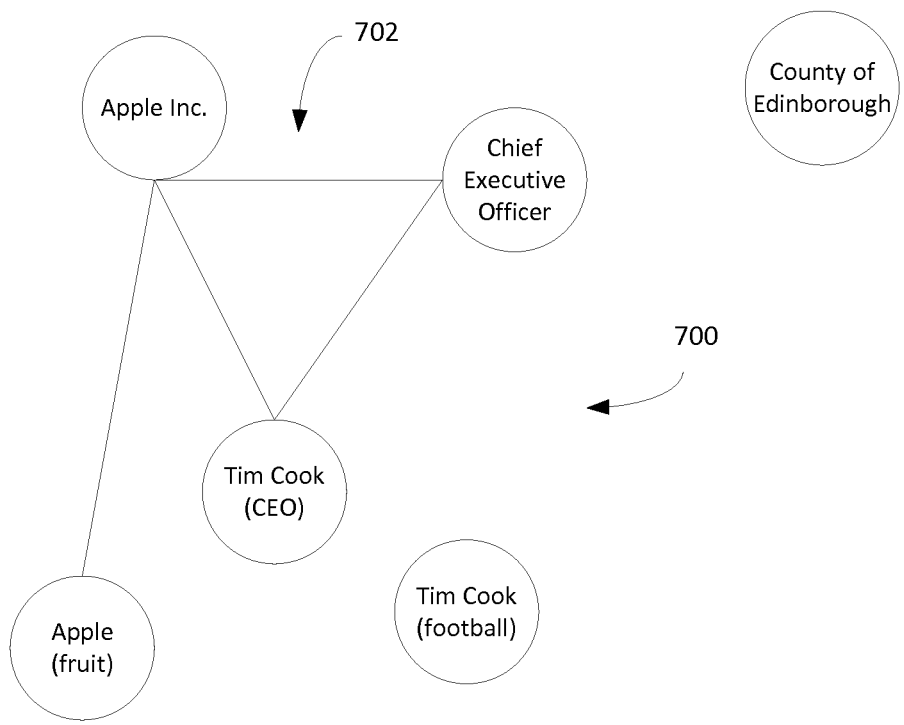
FIG. 7B is a sample clique graph pertaining to FIG. 7A, according to one embodiment of the present disclosure.

Another score metric or metrics for each spot are based on cliques, and may also be used in generating an overall score for each spot. The population of candidates (spots) for an article is used to generate a clique graph from the disambiguation database (operation 630). FIG. 7B illustrates some of the possible spots for the spotted strings of a sample phrase and a clique graph for the spots of the referenced sentence. The graph 700 shows various edges interconnecting the spots, where each edge represents a hyperlink between entities as discovered from the knowledge base and tracked in the disambiguation database. In general, hyperlinks in the knowledge base may have a source and destination such that the edge between spots may be directed. In one implementation, the disambiguation system utilizes these directed edges directly to further analyze the graph. In another implementation, the disambiguation system "promotes" directed edges to undirected edges, which amounts to providing a link in the reverse direction wherever it is missing. Returning to the example illustrated in the graph 700, it can be seen that there are edges between "Apple Inc.", "Tim Cook" and "CEO" that form a closed sub graph 702. Each such closed sub graph may be referred to as a clique. Moreover, since it formed from three spots, it may have a clique value of three representing the number of interconnected spots that form the clique. The clique graph is processed to identify each such clique and establish a rank (or iteration) for each spot within a set based on the number of edges that form the clique to which the spot belongs. The rank and other clique based attributes are used to generate various possible score metrics, which may be used to generate a probability that an entity is correctly matched to a string (operation 640).

In some instances, cliques with similar sizes and scores occur in the same document. In this case, the disambiguation system may apply various strategies to resolve the ambiguity of cliques with similar sizes and scores. For example, the system may let the tie persist, and provide identical clique scores to the candidate spots contained in the cliques. In another implementation, the system relies on other signals and scores in the disambiguation system to help choose the best spots. For example, the system may select one of the similarly sized or scored cliques by using factors such as arrival probabilities values, entity frequencies, or any of the other signals available in the system.

It is often the case across that, for one or more strings in the article, none of the candidate spots is appropriate or desired as a linked entity for that string. In other words, there is a "NULL" or empty entity that the disambiguation system may consider to be an implicit or explicit candidate in the selection process. In one embodiment, a specialized system may decide whether to use a NULL or empty entity by examining signals such as the link frequency of the string, and the probabilities for the various candidate spots under consideration. In another embodiment, the probability computed by the disambiguation system may be subjected to a threshold value, so that only those spots whose probability score exceeds the threshold are emitted by the disambiguation system. In this embodiment, for any string whose candidate spots' probabilities fall below the threshold value, the candidate NULL is selected for those strings, effectively removing those strings from consideration by the system.

The rank of each spot within a set is also a function of a score assigned to the clique to which the spot belongs where the clique score is a summation of each spot score of the clique. Each spot score is a function of the entity frequency and the link frequency for that spot. In one specific example, a given spot has a score as the ratio of Entity 10/Link10. A clique, in turn, is given a clique score as a summation of the scores of the spots that form the clique. Further, the clique scores can be computed at various times in the process, allowing them to take advantage of any previously computed scores to serve as the score of a node. Regardless, the score of a clique is typically the summation of the constituent node scores Each spot is thus ranked based on the number of edges that form the clique to which it belongs and a summation the scores for each node in the clique to which is belongs is also considered, both of which may be a score metric for the spot. Finally, each clique is also processed to identify a third signal that is assigned to a spot based on the highest position in a sorted list. The third score is given by sorting the cliques by decreasing clique score, then for a given spot, its score is the rank of the best ranked clique to which it belongs, similar to the tiebreaking operation discussed above. For example, there may be three base clique scores calculated: cliqueSize, cliqueScore, and cliqueGeneration. CliqueSize is the number of candidate entities in the complete sub-graph. CliqueScore is the sum of the node scores for those candidate entities in the clique. CliqueGeneration is the "iteration number" indicating the iteration that the clique is decided upon, i.e., there will likely be one large, strong clique covering many coherent entities in the article.

The various signals (score metrics) for each spot are used to generate a probability that the spot (candidate) correctly associates with the spotted string for the set (operation 650). The probability also accounts for the ARP. More specifically, each candidate with a set of candidates for each spotted string is assigned a probability. The probability addresses the likelihood that the candidate is the correct entity for the spotted string. Through the use of the disambiguation database, the ARP, and the clique based signals, the probabilities account for the relative influence of any given entity as well as the coherence of the strings within the document. So, for example, a spot that is a member of a large clique with more influential entities will receive a higher probability than a spot from a small clique with low influence entities. The highest probability candidate (or all candidates exceeding a threshold) is assigned to the string.

More specifically, various forms of analysis and computation may be conducted relative to the various score metrics assigned to each spot to generate a probability or other score quantifying the likelihood that a spot (candidate) is proper for the spotted string. Generally speaking, logistic regression or bagged tree computations may be used, in two possible implementations. With respect to using bagged trees, some number of flowcharts are used (trees) that example the features of a given spot, including but not limited to the score metrics computed for the spot, and provides a binary conclusion (e.g., 1=match, 0=not match), as to whether the spot is a match to the string or not. For example, a relatively low link probability (e.g., 0.0001) may generate a 0 whereas a relatively high link probability (e.g., 0.5) may generate a 1, a link probability above 0.5, and a case match may generate a 1 whereas as a case mismatch may generate a 0, a clique rank above 2 may generate a 1, and a clique rank of 2 or less may generate a 0. The percentage of 1 relative to the total number of decision tress may generate the probability.

In one implementation of the disambiguation system, the system may perform a coherence resolution operation to remove or combine strings that are related or synonymous. For example, an article will often introduce a person in the article by their first and last name. However, throughout the rest of the article, the person may be referred to by either the first name or the last name, but not often both. Thus, rather than extracting the string including the first name and the last name and the string including just the last name as separate strings, the disambiguation system may identify the related strings as the same entity in the article. In one example, the system may break the string into the separate first and last name components and compare the separate strings to other strings occurring in the article. In a similar manner, the disambiguation system may recognize acronyms within an article and combine said acronyms with related strings from the article. For example, the article may include the string "Chief Executive Officer" at an early point in the article, but shorten the title to "CEO" through the rest of the article. In this example, the system may recognize that the string includes a plurality of words that are all capitalized. The system may then combine the instances in the article of the same capitalized letters as referring to the same entity. In one implementation, the disambiguation system may maintain all related instances of strings and combine when performing entity scoring, discussed in more detail below. In another implementation, the occurrences of related strings may be combined prior to disambiguation.

Figure 8:
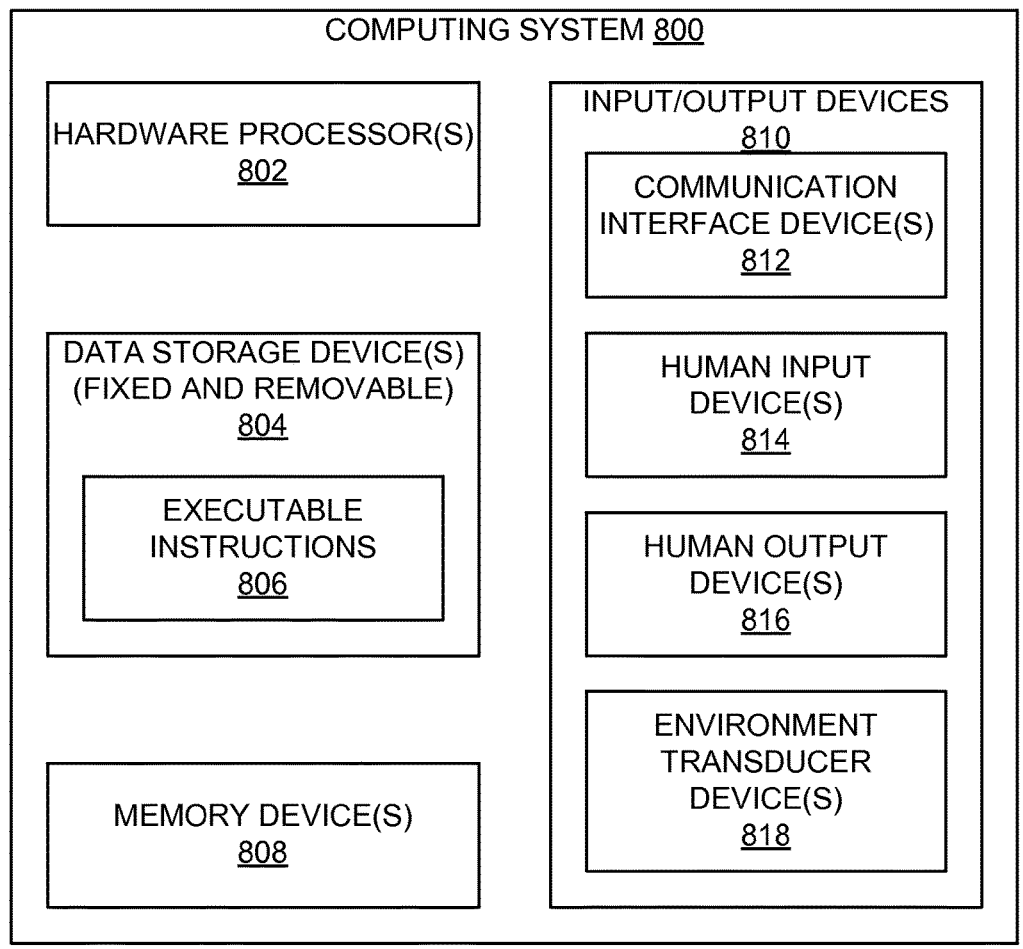
FIG. 8 is an example computing system that may implement various systems and methods discussed herein.

FIG. 8 is a block diagram of a machine in the example form of a computer system 800 within which instructions 806 for causing the machine to perform any one or more of the methodologies discussed herein may be executed by one or more hardware processors 802. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. In some examples, the machine may be a desktop computer, a laptop computer, a tablet computer, a television receiver or set-top box (STB), a video streaming device, a smart television, a smartphone, a gaming system, a web appliance, a communication network node (e.g., a network router, switch, or bridge), a computing system embedded within another device or system (e.g., a household appliance), or any machine capable of executing instructions 806 (sequential or otherwise) that specify actions to be taken by that machine. Further, while only a single machine is illustrated, the term "machine" shall also be taken to include any collection of machines that individually or jointly execute a set (or multiple sets) of instructions 806 to perform any one or more of the methodologies discussed herein.

As depicted in FIG. 8, the example computing system 800 may include one or more hardware processors 802, one or more data storage devices 804, one or more memory devices 808, and/or one or more input/output devices 810. Each of these components may include one or more integrated circuits (ICs) (including, but not limited to, FPGAs, ASICs, and so on), as well as more discrete components, such as transistors, resistors, capacitors, inductors, transformers, and the like. Various ones of these components may communicate with one another by way of one or more communication buses, point-to-point communication paths, or other communication means not explicitly depicted in FIG. 8. Additionally, other devices or components, such as, for example, various peripheral controllers (e.g., an input/output controller, a memory controller, a data storage device controller, a graphics processing unit (GPU), and so on), a power supply, one or more ventilation fans, and an enclosure for encompassing the various components, may be included in the example computing system 800, but are not explicitly depicted in FIG. 8 or discussed further herein.

The at least one hardware processor 802 may include, for example, a central processing unit (CPU), a microprocessor, a microcontroller, and/or a digital signal processor (DSP). Further, one or more hardware processors 802 may include one or more execution cores capable of executing instructions and performing operations in parallel with each other.

The one or more data storage devices 804 may include any non-volatile data storage device capable of storing the executable instructions 806 and/or other data generated or employed within the example computing system 800. In some examples, the one or more data storage devices 804 may also include an operating system (OS) that manages the various components of the example computing system 800 and through which application programs or other software may be executed. Thus, in some embodiments, the executable instructions 806 may include instructions of both application programs and the operating system. Examples of the data storage devices 804 may include, but are not limited to, magnetic disk drives, optical disk drives, solid state drives (SSDs), flash drives, and so on, and may include either or both removable data storage media (e.g., Compact Disc Read-Only Memory (CD-ROM), Digital Versatile Disc Read-Only Memory (DVD-ROM), magneto-optical disks, flash drives, and so on) and non-removable data storage media (e.g., internal magnetic hard disks, SSDs, and so on).

The one or more memory devices 808 may include, in some examples, both volatile memory (such as, for example, dynamic random access memory (DRAM), static random access memory (SRAM), and so on), and non-volatile memory (e.g., read-only memory (ROM), flash memory, and the like). In one embodiment, a ROM may be utilized to store a basic input/output system (BIOS) to facilitate communication between an operating system and the various components of the example computing system 800. In some examples, DRAM and/or other rewritable memory devices may be employed to store portions of the executable instructions 806, as well as data accessed via the executable instructions 806, at least on a temporary basis. In some examples, one or more of the memory devices 808 may be located within the same integrated circuits as the one or more hardware processors 802 to facilitate more rapid access to the executable instructions 806 and/or data stored therein.

The one or more data storage devices 804 and/or the one or more memory devices 808 may be referred to as one or more machine-readable media, which may include a single medium or multiple media (e.g., a centralized or distributed database, and/or associated caches and servers) that store the one or more executable instructions 806 or data structures. The term "machine-readable medium" shall also be taken to include any tangible medium that is capable of storing, encoding, or carrying instructions 806 for execution by the machine and that cause the machine to perform any one or more of the methodologies of the present disclosure, or that is capable of storing, encoding, or carrying data structures utilized by or associated with such instructions 806.

The input/output devices 810 may include one or more communication interface devices 812, human input devices 814, human output devices 816, and environment transducer devices 818. The one or more communication interface devices 812 may be configured to transmit and/or receive information between the example computing system 800 and other machines or devices by way of one or more wired or wireless communication networks or connections. The information may include data that is provided as input to, or generated as output from, the example computing device 800, and/or may include at least a portion of the executable instructions 806. Examples of such network or connections may include, but are not limited to, Universal Serial Bus (USB), Ethernet, Wi-Fi®, Bluetooth®, Near Field Communication (NFC), Long-Term Evolution (LTE), and so on. One or more such communication interface devices 810 may be utilized to communicate one or more other machines, either directly over a point-to-point communication path, over a wide area network (WAN) (e.g., the Internet), over a local area network (WAN), over a cellular (e.g., third generation (3G) or fourth generation (4G)) network, or over another communication means. Further, one or more of one of wireless communication interface devices 812, as well as one or more environment transducer devices 818 described below, may employ an antenna for electromagnetic signal transmission and/or reception. In some examples, an antenna may be employed to receive Global Positioning System (GPS) data to facilitate determination of a location of the machine or another device.

In some embodiments, the one or more human input devices 814 may convert a human-generated signal, such as, for example, human voice, physical movement, physical touch or pressure, and the like, into electrical signals as input data for the example computing system 800. The human input devices 814 may include, for example, a keyboard, a mouse, a joystick, a camera, a microphone, a touch-sensitive display screen ("touchscreen"), a positional sensor, an orientation sensor, a gravitational sensor, an inertial sensor, an accelerometer, and/or the like.

The human output devices 816 may convert electrical signals into signals that may be sensed as output by a human, such as sound, light, and/or touch. The human output devices 816 may include, for example, a display monitor or touchscreen, a speaker, a tactile and/or haptic output device, and/or so on.

The one or more environment transducer devices 818 may include a device that converts one form of energy or signal into another, such as from an electrical signal generated within the example computing system 800 to another type of signal, and/or vice-versa. Further, the transducers 818 may be incorporated within the computing system 800, as illustrated in FIG. 8, or may be coupled thereto in a wired or wireless manner. In some embodiments, one or more environment transducer devices 818 may sense characteristics or aspects of an environment local to or remote from the example computing device 800, such as, for example, light, sound, temperature, pressure, magnetic field, electric field, chemical properties, physical movement, orientation, acceleration, gravity, and so on. Further, in some embodiments, one or more environment transducer devices 818 may generate signals to impose some effect on the environment either local to or remote from the example computing device 800, such as, for example, physical movement of some object (e.g., a mechanical actuator), heating or cooling of a substance, adding a chemical substance to a substance, and so on.

With the foregoing in mind, a general description is provided above of suitable electronic devices that may be used to implement the display of a table in an application and to allow definition of display designations, and subsequent summary table display that allow progressive revelation of nested designation and other operations to be performed on the table as discussed herein.

In certain embodiments, an input structure and display may be provided together, such as in the case of a touchscreen, where a touch sensitive mechanism is provided. In embodiments using a touchscreen, the user may select or interact with displayed interface elements (such as column or row elements of a displayed summary table) via the touch sensitive mechanism. In this way, the displayed interface may provide interactive functionality, allowing a user to navigate the displayed interface by touching the display.

With the foregoing in mind, some of the methods and systems discussed herein may be used to provide articles to a handheld device, such as the tablet computer 112 or a smartphone 110. By way of example, the handheld device may be a model of an iPad®, iPod®, iPhone® or Apple Watch® available from Apple Inc. of Cupertino, Calif. It should be noted that while the handheld device is provided in the context of a smartphone or tablet, other types of handheld devices (such as media players for playing music and/or video, personal data organizers, handheld game platforms, electronic books, handheld GPS navigation units, and/or combinations of such devices) may also be suitably provided. Further, a suitable handheld device may incorporate the functionality of one or more types of devices, such as a media player, a cellular phone, a gaming platform, an electronic book, a personal data organizer, and so forth.

Figure 9A:
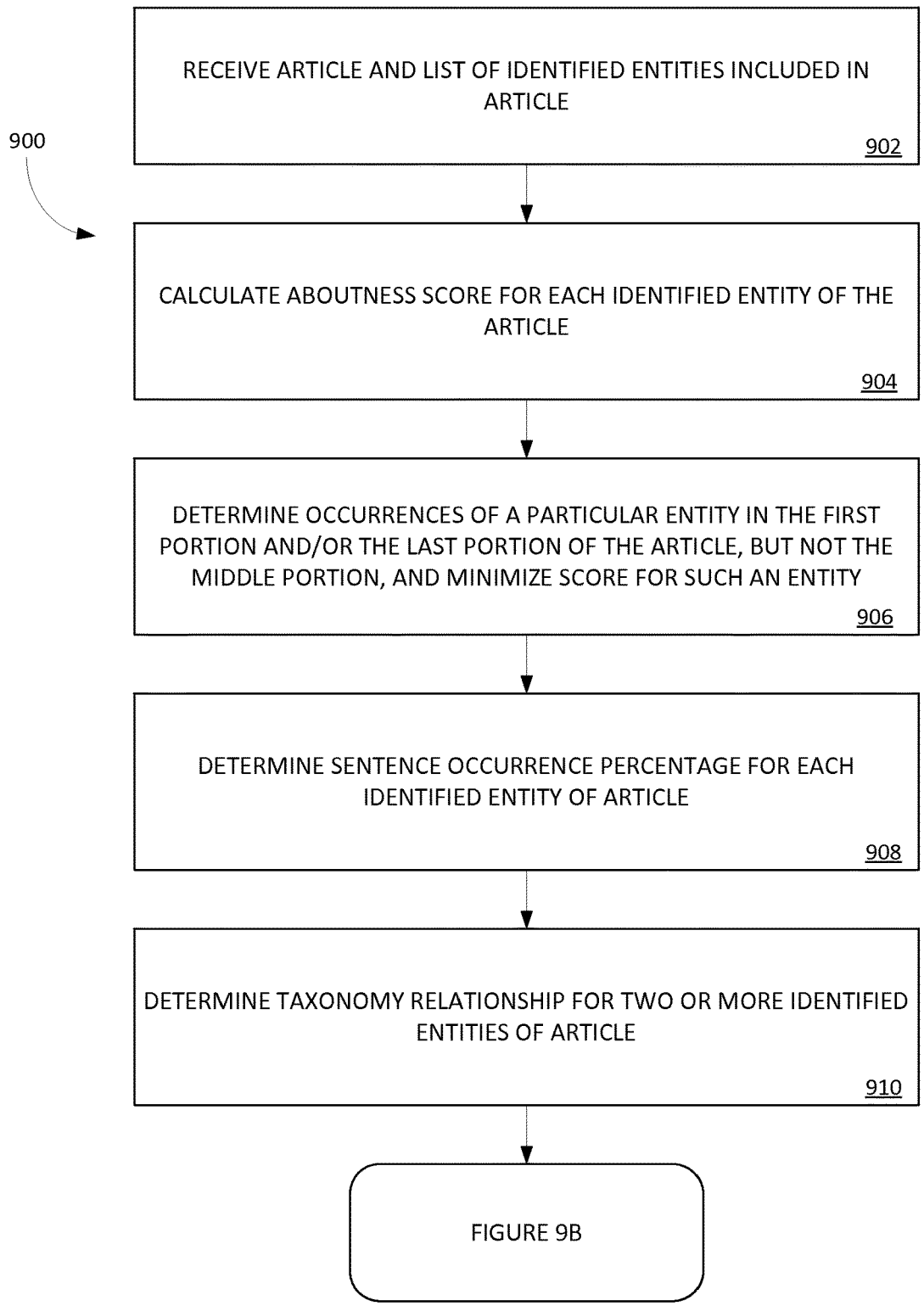
FIGS. 9A and 9B is a flowchart for a method to rank entities identified in an article.
Figure 9B:
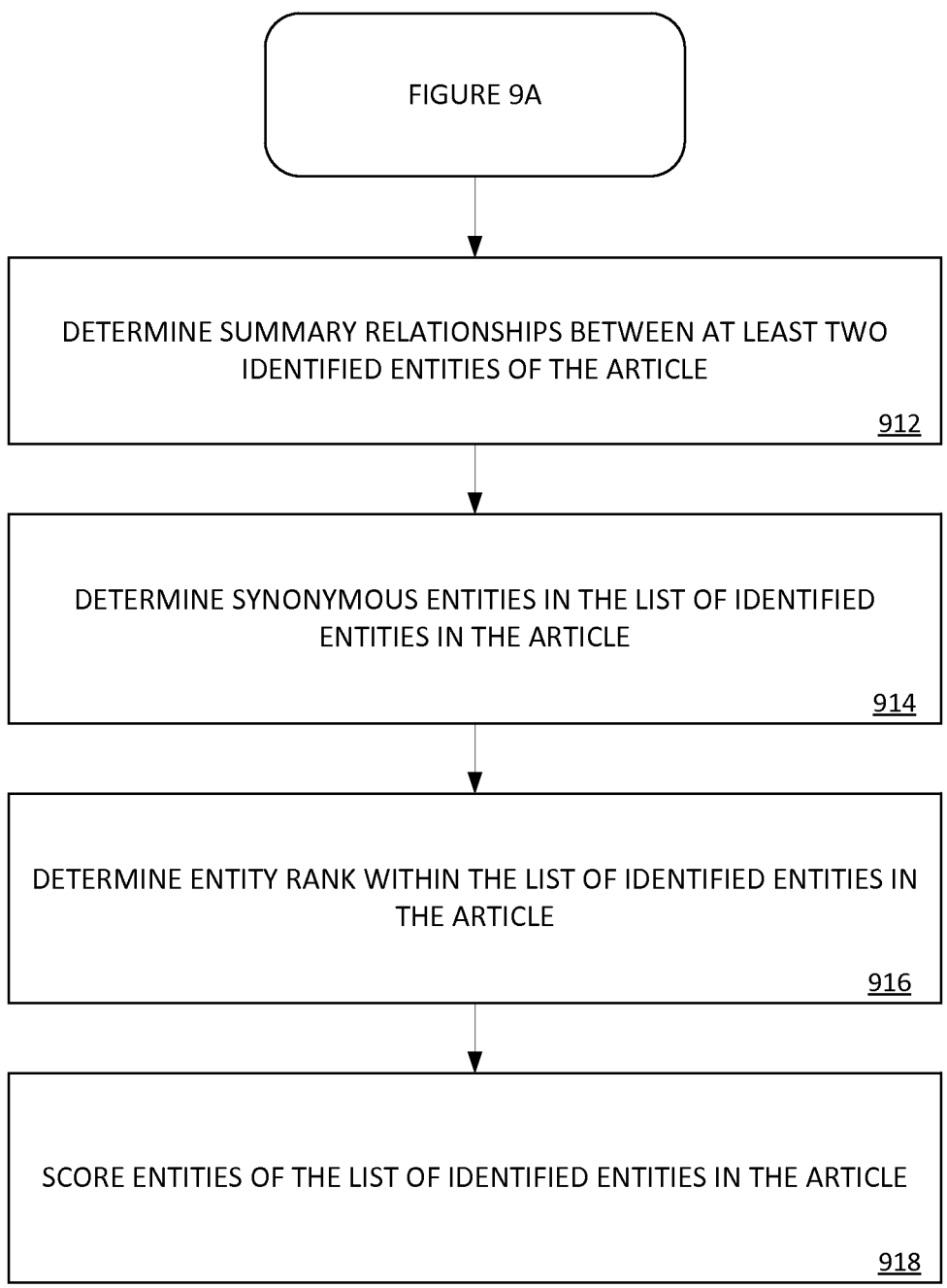

Once a list of entities identified in the article is created as described above, the article is stored in an article database and associated with the identified entities. However, not every entity identified or spotted in the article may be of particular importance to the article. For example, a particular article may mention that two world leaders signed an agreement while drinking tea. Although the string "tea" may be identified in the article by the system and treated as a possible entity of the article, the general topic of the article is not about tea, but rather about the agreement of the world leaders. In general, the entity list for an article may not include the relative importance of the entities to the topic covered or discussed in the article. Rather, those entities identified in the article by the system made the list of entities included in the entity database and disambiguated by the system. Thus, FIGS. 9A and 9B is a flowchart for a method to rank entities identified in an article to determine the general topic or meaning of an article available through an article providing system based on the list of identified or spotted entities. In one implementation, the method of FIGS. 9A and 9B is performed by the entity ranker 130 illustrated in FIG. 1 after the spotted entities are disambiguated by the system.

Beginning in operation 902, the entity ranker 130 receives a classified article for and a list of identified or spotted entities included in the article. The identified entities may be identified and, in some instances, disambiguated as described above to determine the highest probable definition of the entities. As such, the identified entities in the article may each be associated with an entity in the entity database and found within the particular article received by the system.

In operation 904, the entity ranker 130 calculates an "aboutness" score for each identified entity associated with the classified article. In general, the aboutness score provides an indication of how much each identified entity describes the general topic or content of the article. One particular implementation of operation 904 is illustrated in the flowchart of the method of FIG. 10A. Thus, the entity ranker 130 performs the method 1000 of FIG. 10A to determine the relative importance of each of the identified entities to the overall topic of the particular article.

Figure 10A:
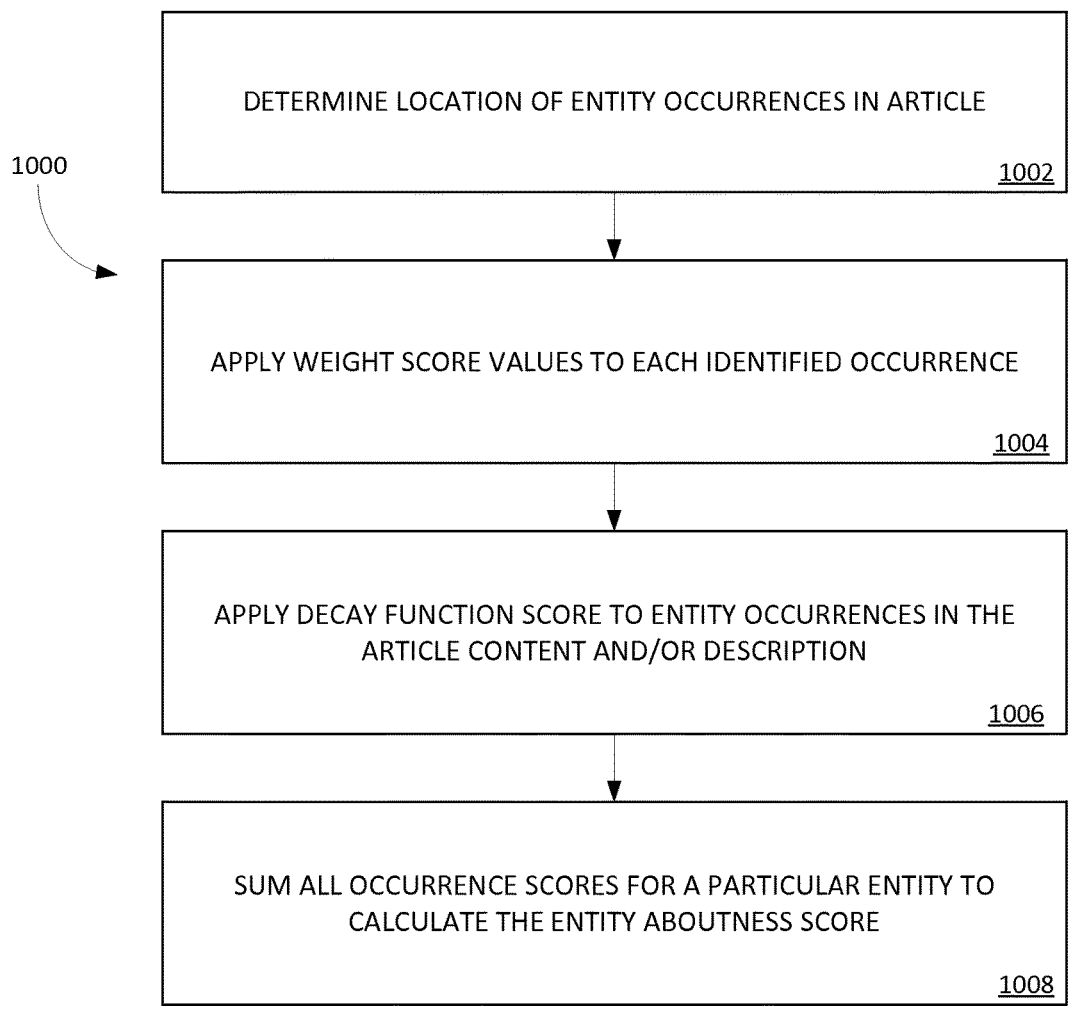
FIG. 10A is a flowchart for a method to determine the importance of an entity to a particular article.

Beginning in operation 1002 of the method 1000 of FIG. 10A, the entity ranker 130 determines the location of each occurrence of the identified entities within the article or otherwise associated with the article. For example, assume a particular received article includes four entities, Entity A, Entity B, Entity C, and Entity D. Thus, each of these entities have been spotted as being included in or associated with the article and disambiguated. Further assume that string of Entity A appears in the article in five locations; once in the title, once in the first sentence of the article, once in the uniform resource locator (URL) at which the article is received from or may be found utilizing a web browser, and twice within the content or body of the article. Entity B may also be present in the article title and in a description or summary associated with the article. Similar occurrences of Entity C and Entity D within the article are also detected and noted by the entity ranker 130. Thus, in this manner, the location or occurrences of each identified entity within the article is noted by the entity ranker 130.

In one particular implementation, the entity ranker 130 classifies the occurrences of the entities in the article into particular categories. For example, the entity ranker 130 detects occurrences of the entities in the article title, a description or summary of the article, the URL at which the article may be retrieved, the content or body of the article, and the first sentence of the article. In general, however, the entity ranker 130 may include any number and type of classifications of locations within the article in which the entities may be determined. For example, the entity ranker 130 may determine if an entity is located within a description accompanying an image in the article, is associated with an identification of a publisher of the article, and/or in an author byline of the article.

In addition to identifying the location of the occurrences within the article for each of the entities, the entity ranker 130 may also apply a weighted score to each occurrence of the entities in operation 1004. In particular, the entity ranker 130 accounts for each occurrence of a particular entity within one of the category locations in the article. Each occurrence may then be multiplied by a weighted value to obtain a score for each occurrence. For example, Entity A may appear once in the title of the article. Further, the entity ranker 130 may associate a weighted value of 10.0 for occurrences of the entity in the title. Thus, the occurrence of Entity A in the title of the article is given a score of 10.0. Similarly, each occurrence of the entity in the URL of the article may be provided with a weighted value of 3.5 and an occurrence of the entity in the first sentence of the article may be provided with a weighted value of 2.5. In general, the weighted value associated with each category location within the article or associated with the article may be any value as determined by an administrator of the system or the system itself. Through the use of the weighted values, the entity ranker 130 may bias the location of occurrences of the entity in the article over other locations. This biasing may account for the likelihood that the occurrence of an entity in one location is more indicative of the overall topic of the article in comparison to other locations, such as in the title over the general body of the article.

Through the operations above, a weighted score is associated with each occurrence of the entities within the article. In one implementation, the weights applied to one or more of the occurrences may be adjusted in accordance with a decay function in relation to the location of the occurrence of the entity in the article in operation 1006. For example, the decay function weighted score value may be applied to occurrences of the entities in the content or body and the description or summary of the article. In general, the decay function operates to provide a higher weighted score value for occurrences of the entity toward the top of the article content or description and a lower weighted score value for occurrences of the entity toward the end of the content or description. One particular decay function to adjust a weighted score value to apply to an occurrence of an entity in the content or description of the article is illustrated in FIG. 10B.

Figure 10B:
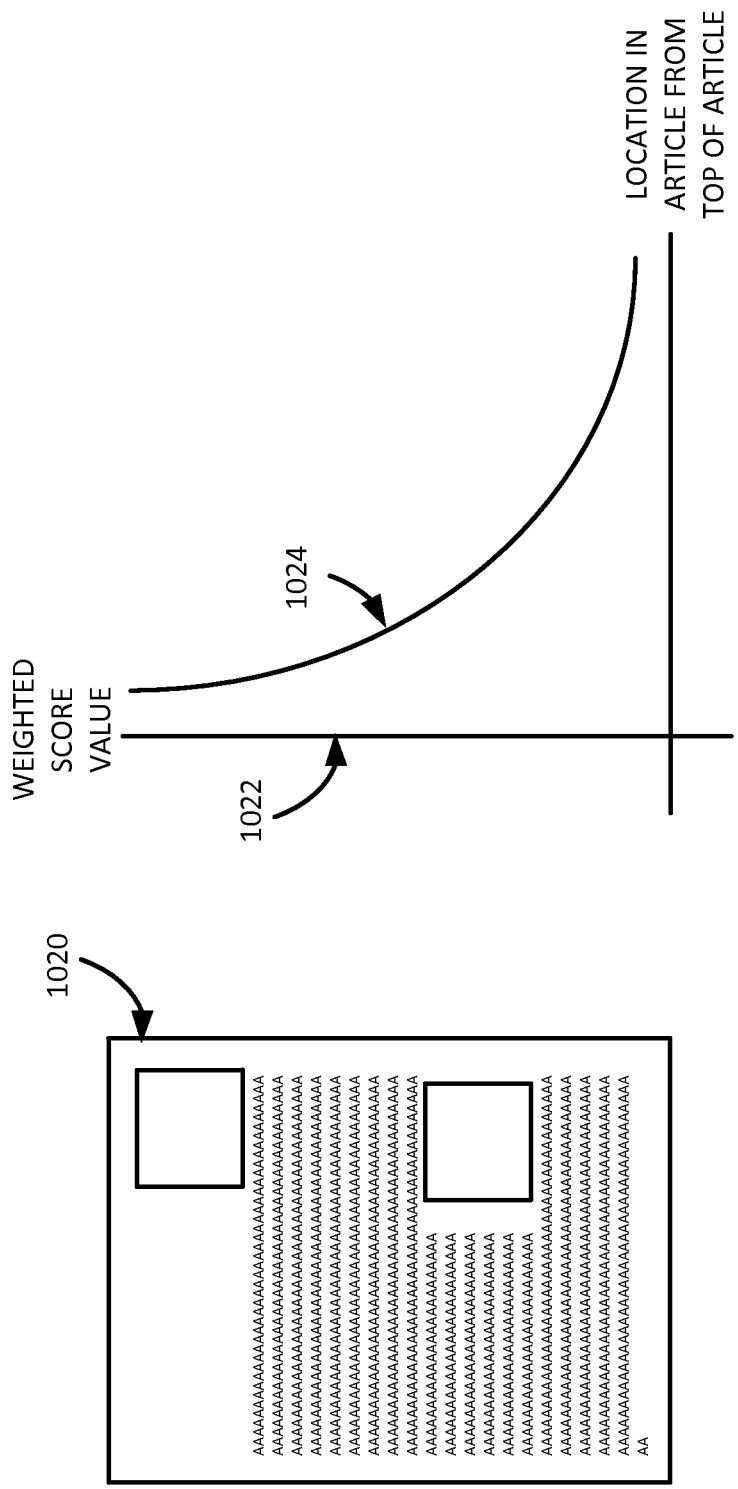
FIG. 10B is a graph illustrating a decay rate associated with the location of an entity within an article.

FIG. 10B includes an illustration of an article 1020, or more particularly, the content or description portion of the article. Also illustrated is a decay function graph 1022 illustrating a decay function curve 1024. The decay function graph 1022 includes a weighted score value along the y-axis of the graph and a location in the article portion along the x-axis. As shown, the weighted score value decreases along the decay function curve 1024 as the occurrence of the entity in the article portion (such as the content or description portion of the article) occur further into the article or further from the top of the article. In other words, the decay function 1024 biases the weighted score value toward the top of the article 1020 over occurrences of the entity toward the bottom of the article. In one example, the occurrence of an entity near the top of the article content may be assigned a weighted value of 3.5, while the occurrence of an entity near the bottom of the article content is assigned a weighted value of 0.5, although any weighted score values may be applied to the occurrences of the entities in the article.

In the example shown in FIG. 10B, the delay function curve 1024 generally follows a double log regression curve. However, the entity ranker 130 may use any decay curve to adjust the weight applied to an occurrence of an entity in the content or description. In another example, the entity ranker 130 may utilize a linear relationship between entity location in the content or description and the weighted score value applied to the occurrence. Further still, the entity ranker 130 may be configured to weight the occurrence of an entity near the bottom of the content higher than occurrences at the top of the article, in some embodiments.

Returning to the method 1000 of FIG. 10A, the entity ranker 130 sums all of the occurrences for a particular entity in the article, with the weighted score value applied to each occurrence. In particular, the entity ranker 130 determines a weighted score value for each occurrence of a particular entity in the article. For example, the entity may appear once in the title and receive a weighted score of 10.0, may appear once description and receive a weighted score of 3.5, may appear once in the URL of the article and receive a weighted score of 3.5, may appear once in the first sentence and receive a weighted score of 2.5, and appear three times in the article content, receiving a weighted score based on a decay curve of 1.0, 0.75, and 0.20 based on the locations of the entity within the content portion of the article. With these weighted scores determined, the entity ranker 130 may then sum all of the weighted scores for the particular entity to calculate an aboutness score for the entity, namely 10.0+3.5+3.5+2.5+1.0+0.75+0.20=21.45 aboutness score. This sum calculation is performed by the entity ranker 130 for each identified entity of the article to calculate the aboutness score for each entity.

Upon calculating the aboutness score for each spotted entity of the article, the entity ranker 130 may return to the method of FIG. 9A and perform operation 906. In this operation, the entity ranker suppresses the importance to the article of one or more entities based on the locations within the overall article length. In particular, the entity ranker 130 determines whether the occurrence of a particular entity appears only in the first portion or last portion of the overall article length, but not in the middle portion. For example, many news articles include the name of a city and the publisher of the article in the first sentence of the article. However, often the name of the city in which the article is filed and the publisher are not necessarily important to determine the main or overall topic of the article. Thus, the entity ranker 130 may detect the entity in the name of a city and the publisher of the article in the first sentence of the article, but in no other location within the article. In such a case, the entity ranker 130 may degrade or lessen the aboutness score associated with that particular entity as the ranker determines the entity is not important to the overall topic of the article. In general, however, the entity ranker 130 may suppress the importance of entities that occur in only a portion of the article and not in other portions in any manner.

In one particular example, the entity ranker 130 determines if a particular entity appears in the first 15% or the last 15% of the article length, but does not appear in the middle 70% of the article length. In such cases, the entity ranker 130 may disregard or otherwise suppress an importance factor associated with the entity as it relates to the article. However, the percentage of the first portion or the last portion may be any percentage of the overall length of the article. Further, the entity ranker 130 may only determine the presence of the entity in the first portion or the last portion, and not necessarily the presence in either.

In operation 908, the entity ranker 130 calculates a total number of sentences in the article and the number of sentences in which each of the particular entities appear. For example, the entity ranker 130 detects Entity A is present in 20 sentences, while the article includes 100 sentences. Thus, the entity ranker 130 determines that Entity A occurs in 20 out of the 100 sentences, or 20% of the sentences. In general, the higher percentage of sentences a particular entity occurs within the article, the more important the entity is to the overall topic of the article. In this manner, the entity ranker 130 not only determines the number of occurrences of a particular entity in the article, but also determines the percentage of the occurrence of the particular entity within the article. Further, the entity ranker 130 may count the occurrence of the entity in a sentence only once, such that multiple occurrences of the entity in one particular sentence in the article is only counted as one occurrence for the entity ranker 130 when determining the percentage of sentences the entity occurs.

Continuing method 900, the entity ranker 130 determines one or more taxonomy relationships between the identified entities of the article in operation 910. In general, two or more entities have a taxonomy relationship if they are connected in one or more taxonomy trees. For example, the entity ranker 130 may maintain or otherwise have access to a taxonomy tree of the entities in the entity database 108. The taxonomy tree is configured to locate broad or generalized entities near the top of the taxonomy tree and more specific or specialized entities at the bottom of the tree. Further, the taxonomy tree may include connections between entities such that the entity ranker 130 may start at the top of the tree at a generalized topic and traverse down the taxonomy tree to other entities related to the generalized topic. Also, as the entity ranker 130 traverses down the taxonomy tree, the entities may become more specific. Such a taxonomy tree may be created or obtained from the knowledge base 114 of the system 100.

To determine one or more taxonomy relationships, the entity ranker 130 may determine if any one entity is connected to another entity in the taxonomy tree. For example, the article may include spotted entities for "U.S. Senator" and "politics". The entity ranker 130 accesses the taxonomy tree to determine if the entry in the taxonomy tree for "U.S. Senator" is linked to the entry in the taxonomy tree for "politics". In one implementation, the entity ranker 130 determines if the entities are directly connected in the taxonomy tree. In another implementation, the entity ranker 130 may include a threshold value for taxonomy relationships. The threshold value is then compared to the number of connections between the two identified entities and a taxonomy connection is determined if the number of connections between the two identified entities is less than or equal to the threshold value. For example, the taxonomy tree may not include a direct connection between "U.S. Senator" and "politics". However, by traversing the taxonomy tree, the entities may be connected through three other entities or nodes in the tree. In this example, if the threshold value for taxonomy connections is three or more, the entity ranker 130 may determine a taxonomy relationship between the entities. When such relationships or connections are determined by the entity ranker 130, the score associated with the entities may be adjusted or some other identification of a connection may be associated with the entities to set a higher importance for those entities that are related through the taxonomy tree.

Similarly, in operation 912, the entity ranker 130 determines a relationship between identified in summaries of a resource database. Similar to the above operation, the entity ranker 130 accesses the knowledge base 114 to obtain a corresponding webpage for each of the identified entities. Each webpage may include summary portion that generally describes the entity topic. In one example, the summary portion of the webpage includes the first four or five sentences of the webpage text. Further, the summary portion of the webpages may include a hyperlink or access string for other webpages of other entities in the entity database. In one implementation, the entity ranker 130 analyzes the summary portion of the webpage associated with a particular identified entity to detect the presence of another identified entity for that article. For example, two identified entities for an article may be "basketball" and "sport". For this entity of the article, the entity ranker 130 analyzes the summary section of the "basketball" webpage of the knowledge base 114. Within the summary, the string "sport" may appear. If this occurs, the entity ranker 130 notes the webpage summary relationship between the "basketball" entity and the "sport" entity and increases the general importance score for these entities. A similar analysis of the summary of the webpage associated with each identified entity of the article to determine a relationship between two or more entities may be performed by the entity ranker 130.

As mentioned, the summary section of the corresponding webpages may also include links to other webpages of the knowledge base 114. Thus, the entity ranker 130 may also determine the links included in a summary of a webpage associated with an identified entity of the article. If such links correspond to other identified entities, the entity ranker 130 may note the relationship of the entities when determining the importance of a particular entity. Continuing the above example, the summary portion of the webpage for "basketball" may not only mention the entity "sport", but may also include a link to the webpage associated with the entity "sport". Such a link may be noted and considered as a relationship between the "basketball" identified entity and the "sport" identified entity when determining the importance of the entity to the overall topic of the article.

In operation 914, the entity ranker 130 analyzes the identified entities to determine synonymous entities to combine scores of such synonymous entities. For example, the entity ranker 130 may determine that some identified entities refer to the same topic, such as the entity "basketball" and the entity "b-ball". The identification of two or more entities as being synonyms of the same topic may utilize the disambiguation database 108 discussed above. In particular, the entity ranker 130 utilizes the entries in the disambiguation database 108 to identify variations of the same entity and correlates such variations as the same entity. Thus, the entity ranker 130 may combine scores for those entities that are synonymous to obtain a global or overall importance score for the topic, regardless of the synonyms identified in the article for that particular topic. In one implementation, the entity ranker 130 may analyze one or more links included in or otherwise associated with a webpage associated with a particular entity. Once a link is identified as a synonym of a particular entity, the entity ranker 130 may combine or otherwise associate the synonymous entities to calculate a combined importance score for the related entities to the article.

Continuing the method 900 of FIGS. 9A and 9B, the entity ranker 130 ranks the identified entities for the article based on one or more of the scores or calculations discussed above. For example, the article may have four entities associated with the article, Entity A, Entity B, Entity C, and Entity D. Through one or more of the above-described operations, the event ranker 130 determines a relative importance of the entity to the overall theme or topic of the article. For example, Entity A-D may have an aboutness score associated with the entities that is adjusted based on the sentence percentage of the entity, the taxonomy relationship with other entities, and/or the presence of synonyms in the list of identified entities. Through the above analysis of the entities, the event ranker 130 may determine a relative importance score for each entity. In operation 916, the entity ranker 130 may then order the entities based on the determined or calculated importance of the entity to the article topic. In one implementation, the identified entities are ranked into an ordered list such that the determined most important entities are at the top of the list and the less important entities are at the bottom of the list. Further, the entity ranker 130 may assign a relative rank identifier to the entities. Continuing the above example, Entity A may be given a rank identifier of 1, with Entity B given a rank identifier of 2, Entity C given a rank identifier of 3, and so on through the ranked list of entities. Once the entities are ordered, the event ranker 130 may associate an importance score with each identified entity in operation 918 to determine which entities are associated with the article for providing the article to a reader application. In particular, the operations of ranking the entities and associating a score with the entities are described in the method 1100 of FIG. 11.

Figure 11:
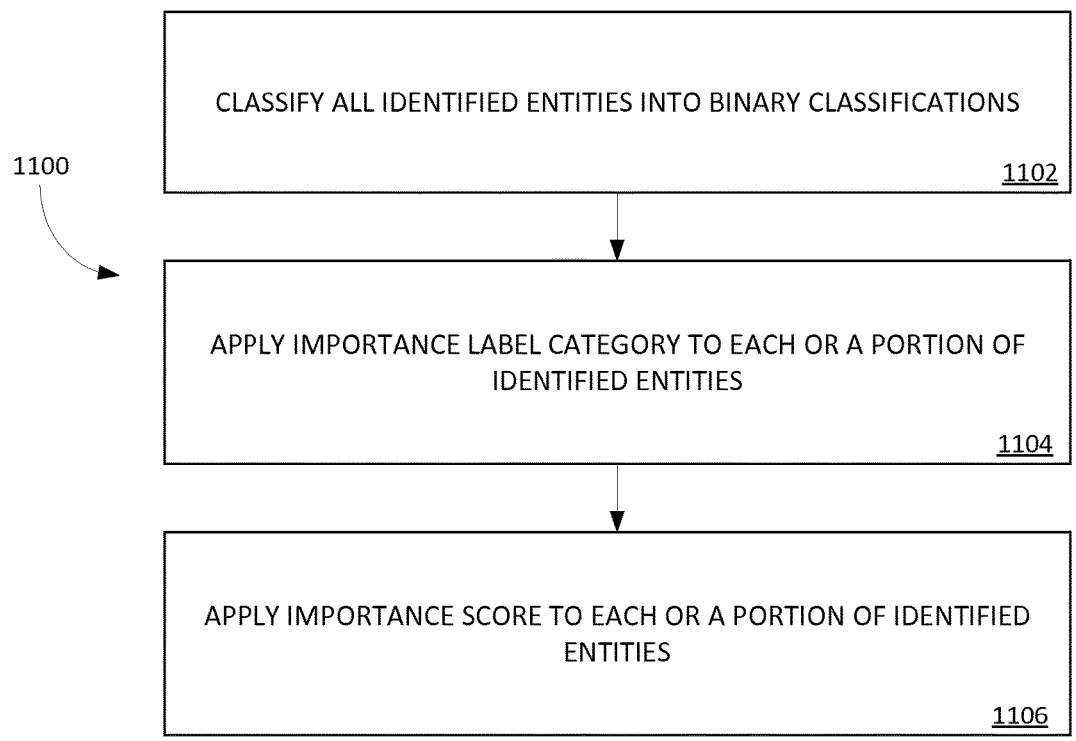
FIG. 11 is a flowchart for a method to associate one or more scores with an identified entity of a particular article.

FIG. 11 is a flowchart for a method to associate one or more scores with an identified entity of a particular article. Similar to the method 900 described above, the method 1100 of FIG. 11 is performed by the event ranker 130. The operations of the method 1100 are typically performed after the entities have been analyzed by the event ranker 130 to determine a relative importance of the entity to the article's overall theme or topic, such as by associating an aboutness score with the entities and determining relationships between the identified entities.

Beginning in operation 1102, the entity ranker 130 classifies each identified entity of the article into a binary classification of being relevant to the article's themes or not relevant to the article's themes. In particular, the entity ranker 130 utilizes the determinations and calculations discussed above to reject or ignore one or more of the identified entities as not relevant to the article's themes. For example, the entity ranker 130 may identify that an entity appears in the first or last portions of the article only, such as a publisher name or author of the article. The entity ranker 130 may then note those entities that appear only in the first or last portions of the article as not relevant. Similarly, the entity ranker 130 may determine that redundant or synonymous entities may be not relevant as the associated scores are combined into a common identified entity.

In one implementation, the entity ranker 130 may obtain or otherwise receive a threshold value that the ranker utilizes to determine the binary classification for one or more of the identified entities. For example, the threshold value may be an aboutness score value of which those entities that have a score that is less than or equal to the threshold value are classified by the ranker 130 as not relevant, while those entities with a score above the threshold value are classified as relevant to the article themes. A similar threshold value may be associated with the sentence percentage of entity occurrences discussed above. Thus, the entity ranker 130 may utilize any obtained or received threshold values to categorize one or more of the identified entities as relevant or not relevant to the article themes.

Once the identified entities of the article is categorized based on the binary classification, the entity ranker 130 may further categorize the important or relevant entities with a more precise importance rating. In one implementation, the entity ranker 130 includes four levels of importance of identified entities and associates an identifier with the entity for each identified entity. For example, the importance labels may categorize the entities into Not Important, Slightly Important, Important, and Very Important. One of the identifiers may be associated with each identified entity of the article. The association of an importance label or category with an entity may be based on any of the analysis conducted on the entities discussed above. For example, the importance label associated with an entity may be based on the entities aboutness score, based on the taxonomy relationship between entities, based on a summary relationship in related webpages between entities, or any combination of such factors.

In addition, the entity ranker 130 may further classify the entities of the article by assigning an importance score with each of or a portion of the identified entities of the article. In one implementation, the importance score is some combination of the above analysis of the identified entities. In another implementation, the importance score is the aboutness score for the particular entity. Regardless of how the importance score for the entity is determined, the score may be utilized by a system that provides articles to a reader application when determining how to categorize the article. In particular, the most important entities to the article's themes may be used to sort the article into a batch of articles of similar entities and provide such articles to a user of a reader application that requests articles associated with the particular entity. In other words, the scored and ranked entities provide an indication of what the article is about for processing by an article providing system.

Although discussed above as methods described by the flowcharts of FIGS. 9A, 9B, 10A, and 11, it should be appreciated that one or more operations may be omitted from the methods discussed. For example, the entity ranker 130 may not perform a taxonomy analysis or summary in a webpage analysis on the identified entity list. Further, the operations may be performed in any order and do not necessarily imply an order as provided. Rather, the methods discussed are merely one embodiment of the present disclosure as contemplated.

Figure 12:
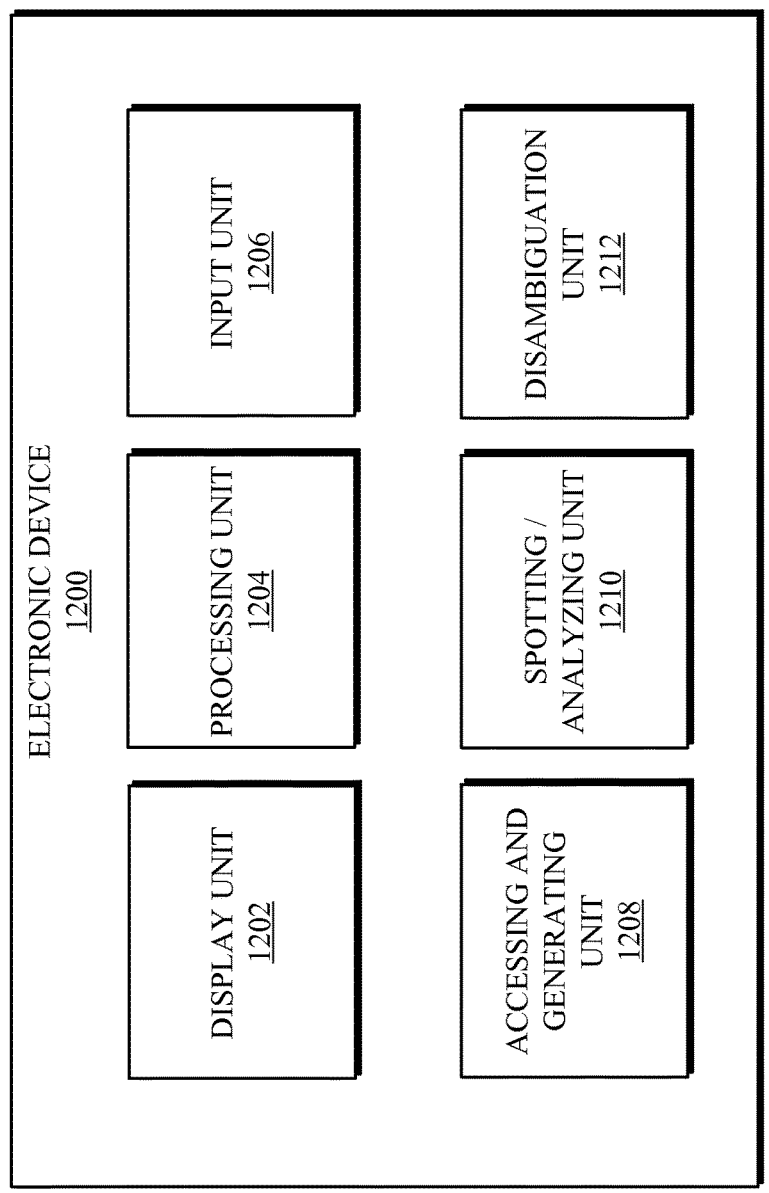
FIG. 12 is a functional block diagram of an electronic device including operational units arranged to perform various operations of a reader application.

FIG. 12 is a functional block diagram of an electronic device including operational units arranged to perform various operations of a reader application. The operational units 1202-1212 of the device 1200 are implemented by hardware or a combination of hardware and software to carry out the principles of the present disclosure. It will be understood by persons of skill in the art that the operational units 1202-1212 described in FIG. 12 may be combined or separated into sub-blocks to implement the principles of the present disclosure. Therefore, the description herein supports any possible combination or separation or further definition of the operational units 1202-1212.

In one implementation, the electronic device 1200 includes a display unit 1202 configured to display information, such as a graphical user interface, and a processing unit 1204 in communication with the display unit 802 and an input unit 1206 configured to receive data from one or more input devices or systems. Various operations described herein may be implemented by the processing unit 1204 using data received by the input unit 1206 to output information for display using the display unit 1202. Further, one or more of the units of the device 1200 may be included in the computer system 1100 described above.

Additionally, in one implementation, the electronic device 1200 includes units implementing the operations described herein. For example, a spotting unit 1208 may spot an article to identify one or more entities, the one or more entities comprising strings of text within the article. A locating unit 1210 determines a location within the article of the occurrences of at least one entity of the one or more entities. An assigning unit 1212 may assign a weighted score to each of the occurrences of the at least one entity of the one or more entities, the weighted score based at least on the location within the article of each of the occurrences. A summing unit 1214 sums the weighted score for each of the occurrences of the at least one entity of the one or more entities to calculate an entity importance score and a scoring unit 1216 assigns the entity importance score to the at least one entity of the one or more entities. A storing unit stores the entity importance score and an identifier of the at least one entity with the article in an article database.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for classifying an article, the method comprising:
    identifying an article by identifying one or more entities, each entity comprising strings of text within the article;
    determining a respective location within the article of each entity occurrence;
    assigning a weighted score to each entity occurrence, the weighted score based at least on the respective location of each entity occurrence;
    summing the weighted score from each entity occurrence for each entity to calculate an entity importance score;
    assigning the entity importance score to each identified entity of the one or more entities;
    storing the entity importance score and an identifier of the identified entity with the article in an article database;
    classifying the article in the article database based at least in part on the entity importance score and the identifier;
    receiving a request for articles of the article database associated with the identified entity; and
    providing the article to a user of a reader application of an electronic device if the entity importance score is greater than a threshold value.

2. The method of claim 1 wherein the respective location within the article is at least one of an article title, an article description, an article uniform resource locator, an article content portion, or a first sentence of the article.

3. The method of claim 2 further comprising:
    adjusting the weighted score of at least one entity occurrence by a decay curve score value when the respective location within the article is the article content portion.

4. The method of claim 2 wherein the weighted score assigned to each entity occurrence in the article title is more than the weighted score assigned to each entity occurrence in the article description.

5. The method of claim 1 further comprising:
    reducing the weighted score for each entity occurrence if the respective location within the article of the respective entity occurrence is only in a beginning portion of the article.

6. The method of claim 1 further comprising:
    calculating a percentage of sentence occurrences of each identified entity in the article by dividing a total number of text sentences in the article in which the identified entity occurs by the total number of text sentences within the article; and
    adjusting the entity importance score for each identified entity of the one or more entities based on the calculated percentage of sentence occurrences of each identified entity in the article.

7. The method of claim 1 further comprising:
    accessing a knowledge database of related entities to determine a synonymous relationship between the identified entity of the article to a second entity of the one or more entities of the article.

8. The method of claim 7 further comprising:
    combining the weighted score of the identified entity of the article and a weighted score of the second entity of the one or more entities of the article to calculate a combined synonymous weighted score.

9. The method of claim 1 further comprising:
    accessing a knowledge database of related entities to determine a taxonomy relationship between the identified entity of the article to at least another entity of the one or more entities of the article.

10. The method of claim 9 wherein the taxonomy relationship between the identified entity of the article to at least another entity of the one or more entities of the article comprises a hyperlink from the identified entity of the article to at least another entity of the one or more entities of the article in the knowledge database.

11. A system for classifying a collection of computer files, the system comprising: an article database storing a plurality of article-based computer files;
    a spotting device in communication with the article database to retrieve a first article of the plurality of article-based computer files from the article database and identify one or more entities within the first article of the plurality of article-based computer files, the one or more entities comprising strings of text within the first article; and
    an entity ranker device executing one or more computer-executable instructions to:
        determine a respective location within the first article of each entity occurrence;
        assign a weighted score to each entity occurrence, the weighted score based at least on the respective location of each entity occurrence;
        sum the weighted score from each entity occurrence for each entity to calculate an entity importance score;
        assign the entity importance score to each identified entity of the one or more entities;
        store the entity importance score and an identifier of the identified entity with the first article in the article database;
        classify the first article in the article database based at least in part on the entity importance score and the identifier;
        receive a request for articles of the article database associated with the identified entity; and
        provide the first article to a user of a reader application of an electronic device if the entity importance score is greater than a threshold value.

12. The system of claim 11 wherein the respective location within the first article is at least one of an article title, an article description, an article uniform resource locator, an article content portion, or a first sentence of the first article.

13. The system of claim 12 wherein the entity ranker device further adjusts the weighted score of at least one entity occurrence by a decay curve score value when the respective location within the first article is the article content portion.

14. The system of claim 12 wherein the weighted score assigned to each entity occurrence in the article title is more than the weighted score assigned to each entity occurrence in the article description.

15. The system of claim 11 wherein the entity ranker device further calculates a percentage of sentence occurrences of each identified entity in the first article by dividing a total number of text sentences in the first article in which the identified entity occurs by the total number of text sentences within the first article and adjusts the entity importance score for the each identified entity of the one or more entities based on the calculated percentage of sentence occurrences of each identified entity in the first article.

16. The system of claim 11 wherein the entity ranker device further accesses a knowledge database of related entities to determine a synonymous relationship between the identified entity of the first article to a second entity of the one or more entities of the first article.

17. The system of claim 16 wherein the entity ranker device further combines the weighted score of each identified entity of the first article and a weighted score of the second entity of the one or more entities of the first article to calculate a combined synonymous weighted score.

18. A non-transitory computer-readable medium storing one or more executable instructions to perform a computer-implemented method, the one or more executable instructions to:

identifying an article by identifying one or more entities, each entity comprising strings of text within the article;

determining a respective location within the article of each entity occurrence;

assigning a weighted score to each entity occurrence, the weighted score based at least on the respective location of each entity occurrence;

summing the weighted score from each entity occurrence for each entity to calculate an entity importance score;

assigning the entity importance score to each identified entity of the one or more entities;

storing the entity importance score and an identifier of the identified entity with the article in an article database;

classifying the article in the article database based at least in part on the entity importance score and the identifier;

receiving a request for articles of the article database associated with the identified entity; and providing the article to a user of a reader application of an electronic device if the entity importance score is greater than a threshold value.

19. The non-transitory computer-readable medium of claim 18 wherein the respective location within the article is at least one of an article title, an article description, an article uniform resource locator, an article content portion, or a first sentence of the article.

20. The non-transitory computer-readable medium of claim 19 wherein the computer-implemented method further comprises:

adjusting the weighted score of at least one entity occurrence by a decay curve score value when the respective location within the article is the article content portion.

* * * * *